(12) United States Patent
Qin et al.

(10) Patent No.: US 11,109,392 B2
(45) Date of Patent: Aug. 31, 2021

(54) COMMUNICATION METHOD, NETWORK DEVICE, AND RELAY DEVICE

(71) Applicant: HUAWEI TECHNOLOGIES CO., LTD., Shenzhen (CN)

(72) Inventors: Yi Qin, Kista (SE); Zhongfeng Li, Shanghai (CN); Yi Ren, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 37 days.

(21) Appl. No.: 16/750,695

(22) Filed: Jan. 23, 2020

(65) Prior Publication Data

US 2020/0163097 A1 May 21, 2020

Related U.S. Application Data

(63) Continuation of application No. PCT/CN2018/097191, filed on Jul. 26, 2018.

(30) Foreign Application Priority Data

Jul. 31, 2017 (CN) .......................... 201710640907.8

(51) Int. Cl.
*H04W 72/12* (2009.01)
(52) U.S. Cl.
CPC .................................... *H04W 72/12* (2013.01)
(58) Field of Classification Search
CPC ...................................................... H04W 72/12
See application file for complete search history.

(56) References Cited

U.S. PATENT DOCUMENTS

| | | | |
|---|---|---|---|
| 2010/0157875 | A1 | 6/2010 | Li et al. |
| 2011/0096701 | A1 | 4/2011 | Lin |
| 2012/0039220 | A1 | 2/2012 | Chen et al. |
| 2012/0057519 | A1 | 3/2012 | Youngseob et al. |
| 2012/0207083 | A1 | 8/2012 | Chen et al. |
| 2013/0343261 | A1 | 12/2013 | Gonsa et al. |
| 2018/0249461 | A1 | 8/2018 | Miao et al. |

FOREIGN PATENT DOCUMENTS

| | | |
|---|---|---|
| CN | 101877865 A | 11/2010 |
| CN | 102171949 A | 8/2011 |
| CN | 102388542 A | 3/2012 |
| CN | 103155473 A | 6/2013 |
| CN | 103220789 A | 7/2013 |
| CN | 103997788 A | 8/2014 |
| CN | 106797609 A | 5/2017 |
| EP | 2482604 A4 | 4/2017 |
| WO | 2016065068 A2 | 4/2016 |

*Primary Examiner* — Angel T Brockman
(74) *Attorney, Agent, or Firm* — Rimon PC

(57) ABSTRACT

This application provides a communication method, a network device, and a relay device for relay devices to discover one another. A first network device determines a first resource, where the first resource includes a resource used by a second network device to send a first signal to a second relay device, or the first resource includes a resource configured by the second network device for a first signal with zero power. The first network device sends first configuration information to a first relay device, where the first configuration information is used by the first relay device to determine a second resource for sending a second signal, and the second resource is a part or all of the first resource.

18 Claims, 14 Drawing Sheets

COMMUNICATION METHOD, NETWORK DEVICE, AND RELAY DEVICE

CROSS-REFERENCE TO RELATED APPLICATIONS

This application is a continuation of International Application No. PCT/CN2018/097191, filed on Jul. 26, 2018, which claims priority to Chinese Patent Application No. 201710640907.8, filed on Jul. 31, 2017. The disclosures of the aforementioned applications are hereby incorporated by reference in their entireties.

TECHNICAL FIELD

This application relates to the communications field, and more specifically, to a communication method, a network device, and a relay device.

BACKGROUND

A long term evolution (LTE)/long term evolution-advanced (LTE-A) system supports relay transmission to improve coverage of a base station. In a communications system that supports relay transmission, there are three types of nodes: a network device, a relay device, and a terminal device. The link between the network device and the relay device is a backhaul (BH) link, and the link between the relay device and the terminal device is an access (AC) link.

If two different relay devices each are sending or receiving a synchronization signal in the same subframe, neither of the relay devices can discover each other because the relay devices do not have the capability of simultaneously sending and receiving signals. Therefore, there is an urgent need to provide a communication method of sending synchronization signals to allow relay devices to discover each other.

SUMMARY

This application provides a communication method, a network device, and a relay device that enable relay devices to discover each other and improve signal transmission efficiency.

According to a first aspect, a communication method is provided, where the communication method includes: determining, by a first network device, a first resource, where the first resource includes a resource used by a second network device to send a first signal to a second relay device, or the first resource includes a resource configured by the second network device for a first signal with zero power; and sending, by the first network device, first configuration information to a first relay device, where the first configuration information is used by the first relay device to determine a second resource for sending a second signal, and the second resource is a part or all of the first resource.

The first network device determines the first resource including the resource used by the second network device to send the first signal to the second relay device, and sends the first configuration information to the first relay device, so that the first relay device determines the second resource that is for sending the second signal and that is in the first resource based on the first configuration information, and sends the second signal on the second resource. In this case, the second relay device can receive the second signal on the part or all of the first resource. That is, the second relay device discovers the first relay device, thereby improving signal transmission efficiency.

In some possible implementations, the first signal may be a synchronization signal, a channel state information reference signal, a demodulation reference signal, a tracking reference signal, a demodulation reference signal of a physical broadcast channel, a sounding reference signal, or a phase tracking reference signal, or may be the foregoing signal with zero power.

According to this embodiment of this application, any one of the foregoing signals can be used as the first signal, so that inter-device discovery can be performed without depending on one type of signal, and flexibility of device discovery is enhanced.

In some possible implementations, the first configuration information is used to indicate the second resource.

The first network device may directly indicate a resource used by the first relay device to send the second signal, so that efficiency of discovering the first relay device by the second relay device is further improved.

In some possible implementations, the first configuration information is used to indicate a third resource used by the first relay device to send the second signal, and the method further includes:

sending, by the first network device, second configuration information to the first relay device, where the second configuration information is used to indicate a time domain offset between the third resource and the second resource.

In this case, in this embodiment of this application, a resource configuration used to send the second signal in an original solution is compatible, and improvement is made based on the original solution, thereby improving compatibility of this embodiment of this application.

In some possible implementations, if the first resource includes the resource used by the second network device to send the first signal to the second relay device, the method further includes:

sending, by the first network device, a third signal to the first relay device on the third resource.

The first network device may send the third signal on the resource originally configured for the first relay device to send the second signal, thereby improving utilization of resources.

In some possible implementations, the time domain offset is at least one of at least one subframe, at least one half-subframe, and at least one slot.

The time domain offset may specifically be the at least one of the at least one subframe, the at least one half-subframe, and the at least one slot, so that the second relay device can determine the second resource more precisely.

In some possible implementations, the method further includes:

sending, by the first network device, first information to the first relay device, where the first information is used by the first relay device to determine at least one of a time domain start moment, a time domain end moment, and period information of the second resource for transmitting the second signal.

The first network device determines, by using the first information, the at least one of the time domain start moment, the time domain end moment, and the period information of the second resource for transmitting the second signal, thereby enhancing flexibility of control signal transmission.

In some possible implementations, sending, by the first network device, first configuration information to a first relay device may be using higher layer signaling, and the higher layer signaling carries the first configuration information.

The first network device adds the first configuration information to the higher layer signaling, and does not need to configure a dedicated resource to send the first configuration resource, thereby reducing system power consumption.

In some possible implementations, the first signal is a first synchronization signal, and the second signal is a second synchronization signal.

The first network device sends the first configuration information to the first relay device, so that the first relay device determines, based on the first configuration information, the second resource in a first resource used by the second network device to send the first synchronization signal to the second relay device, and sends the second synchronization signal on the second resource. Therefore, the second relay device discovers the first relay device by using the second synchronization signal. This embodiment of this application provides an implementation of device discovery, so that signal transmission efficiency can be improved.

According to a second aspect, a communication method is provided, where the communication method includes: receiving, by a first relay device, first configuration information sent by a first network device; determining, by the first relay device, a second resource based on the first configuration information, where the second resource is a part or all of a first resource, and the first resource includes a resource used by the second network device to send a first signal to the second relay device, or the first resource includes a resource configured by the second network device for a first signal with zero power; and sending, by the first relay device, a second signal on the second resource.

The first relay device receives the first configuration information sent by the first network device, determines the second resource that is for sending the second signal and that is in the first resource based on the first configuration information, and sends the second signal on the second resource, so that the second relay device can receive the second signal on the part or all of the first resource. That is, the second relay device discovers the first relay device, thereby improving signal transmission efficiency.

In some possible implementations, the first configuration information is used to indicate the second resource.

If the first configuration information indicates a resource used by the first relay device to send the second signal, the first relay device may directly determine the second resource, so that efficiency of discovering the first relay device by the second relay device is further improved.

In some possible implementations, the first configuration information is used to indicate a third resource used by the first relay device to send the second signal, and the method further includes:

receiving, by the first relay device, second configuration information sent by the first network device, where the second configuration information is used to indicate a time domain offset between the third resource and the second resource; and the determining, by the first relay device, a second resource based on the first configuration information includes:

determining, by the first relay device, the second resource based on the first configuration information and the time domain offset.

In this case, in this embodiment of this application, a resource configuration used by the first relay device to send the second signal in an original solution is compatible, and improvement is made based on the original solution. In this embodiment of this application, system compatibility is improved.

In some possible implementations, if the first resource includes the resource used by the network device to send the first signal to the second relay device, the method further includes: receiving, by the first relay device on the third resource, a third signal sent by the first network device.

The first relay device may receive the third signal on the resource originally configured by the first network device for the first relay device to send the second signal, thereby improving utilization of resources.

In some possible implementations, the time domain offset is at least one of at least one subframe, at least one half-subframe, and at least one slot.

The time domain offset may specifically be the at least one of the at least one subframe, the at least one half-subframe, and the at least one slot, so that the second relay device can determine the second resource more precisely.

In some possible implementations, before the sending, by the first relay device, the second signal on the second resource, the method further includes: receiving, by the first relay device, first information sent by the first network device; and determining, by the first relay device based on the first information, at least one of a time domain start moment, a time domain end moment, and period information of the second resource for transmitting the second signal.

The first relay device determines, by using the first information, the at least one of the time domain start moment, the time domain end moment, and the period information of the second resource for transmitting the second signal, thereby enhancing flexibility of control signal transmission.

In some possible implementations, the first relay device receives higher layer signaling sent by the first network device, and the higher layer signaling carries the first configuration information.

The first relay device receives the first configuration information added by the first network device to the higher layer signaling, and the first network device does not need to configure a dedicated resource to send the first configuration resource, thereby reducing system power consumption.

In some possible implementations, the first signal is a first synchronization signal, and the second signal is a second synchronization signal.

The first network device sends the first configuration information to the first relay device, so that the first relay device determines, based on the first configuration information, the second resource in a first resource used by the second network device to send the first synchronization signal to the second relay device, and sends the second synchronization signal on the second resource. Therefore, the second relay device discovers the first relay device by using the second synchronization signal. This embodiment of this application provides an implementation of device discovery, so that signal transmission efficiency can be improved.

According to a third aspect, a communication method is provided, where the communication method includes:

receiving, by a second relay device, first configuration information sent by a second network device; determining, by the second relay device, a first resource based on the first configuration information, where the first resource includes a resource used by the second network device to send a first signal to the second relay device, or the first resource includes a resource configured by the second network device for a first signal with zero power; and receiving, by the second relay device on a second resource, a second signal sent by the first relay device, where the second resource is a part or all of the first resource.

The second relay device receives the first configuration information sent by the second network device, and determines the first resource based on the first configuration information, where the first resource includes the resource used by the second network device to send the first signal to the second relay device or the resource configured by the second network device for the first signal with zero power. The second relay device receives, on the second resource in the first resource, the second signal sent by the first relay device. In this case, the second relay device can discover the first relay device, thereby improving signal transmission efficiency.

In some possible implementations, if the first resource includes the resource used by the second network device to send the first signal to the second relay device, the method further includes: receiving, by the second relay device on the first resource, the first signal sent by the second network device.

The second relay device may further receive, on the first resource, the first signal sent by the second network device. That is, the second relay device can simultaneously receive the first signal and the second signal on the first resource. The second relay device can still discover the first relay device without affecting receiving of the first signal. In this embodiment of this application, system compatibility is improved.

In some possible implementations, the receiving, by a second relay device, first configuration information sent by the second network device includes:

receiving, by the second relay device, higher layer signaling sent by the second network device, where the higher layer signaling carries the first configuration information.

The second relay device receives the first configuration information added by the second network device to the higher layer signaling, and a first network device does not need to configure a dedicated resource to send the first configuration resource, thereby reducing system power consumption.

In some possible implementations, the first signal is a first synchronization signal, and the second signal is a second synchronization signal.

This embodiment of this application provides a specific implementation of device discovery, so that signal transmission efficiency can be improved.

According to a fourth aspect, a communication method is provided, where the communication method includes:

determining, by a second network device, a first resource, where the first resource includes a resource used by the second network device to send a first signal to a second relay device, or the first resource includes a resource configured by the second network device for a first signal with zero power; and sending, by the second network device, first configuration information to the second relay device, where the first configuration information is used to indicate the first resource, a part or all of the first resource is a second resource, and the second resource is used by the second relay device to receive a second signal sent by the first relay device.

The second network device determines the first resource, and sends the first configuration information to the second relay device, where the first configuration information is used to indicate the first resource, the second resource in the first resource is used by the second relay device to receive the second signal sent by the first relay device. Therefore, the second relay device can discover the first relay device, thereby improving signal transmission efficiency.

In some possible implementations, if the first resource includes the resource used by the second network device to send the first signal to the second relay device, the method further includes:

sending, by the second network device, the first signal to the second relay device on the first resource.

If the first resource includes the resource used by the second network device to send the first signal to the second relay device, the second network device may send the first signal to the second relay device on the first resource, so that the second relay device can simultaneously receive the first signal and the second signal. The second relay device can still discover the first relay device without affecting receiving of the first signal. In this embodiment of this application, system compatibility is improved.

In some possible implementations, if the first resource includes the resource configured by the second network device for the first signal with zero power, the method further includes:

determining, by the second network device, not to send the first signal on the first resource.

If the first resource includes the resource configured by the second network device for the first signal with zero power, the second network device does not send the first signal on the first resource, so that the second relay device can receive, on the second resource in the first resource, the second signal sent by the first relay device, thereby improving signal transmission efficiency.

In some possible implementations, the sending, by the second network device, first configuration information to the second relay device includes:

sending, by the second network device, higher layer signaling to the second relay device, where the higher layer signaling carries the first configuration information.

The second network device adds the first configuration information to the higher layer signaling, and does not need to configure a dedicated resource to send the first configuration resource, thereby reducing system power consumption.

In some possible implementations, the first signal is a first synchronization signal, and the second signal is a second synchronization signal.

This embodiment of this application provides a specific implementation of device discovery, so that signal transmission efficiency can be improved.

According to a fifth aspect, a communication method is provided in this application, where the communication method includes:

determining, by a first network device, a first resource, where the first resource includes a resource used by a second network device to send a first signal to a second relay device, or the first resource includes a resource configured by the second network device for a first signal with zero power; sending, by the first network device, first configuration information to a first relay device; determining, by the first relay device, a second resource based on the first configuration information, where the second resource is a part or all of the first resource; and sending, by the first relay device, a second signal on the second resource.

The first network device determines the first resource including the resource used by the second network device to send the first signal to the second relay device, and sends the first configuration information to the first relay device. The first relay device determines the second resource that is for sending the second signal and that is in the first resource based on the first configuration information, and sends the second signal on the second resource, so that the second relay device can receive the second signal on the part or all of the first resource. That is, the second relay device discovers the first relay device, thereby improving signal transmission efficiency.

In some possible implementations, the first configuration information is used to indicate the second resource.

The first network device may directly indicate a resource used by the first relay device to send the second signal, so that efficiency of discovering the first relay device by the second relay device is further improved.

In some possible implementations, the first configuration information is used to indicate a third resource used by the first relay device to send the second signal, and the method further includes:

sending, by the first network device, second configuration information to the first relay device, where the second configuration information is used to indicate a time domain offset between the third resource and the second resource; and the determining, by the first relay device, a second resource based on the first configuration information includes:

determining, by the first relay device, the second resource based on the first configuration information and the time domain offset.

In this case, in this embodiment of this application, a resource configuration used to send the second signal in an original solution is compatible, and improvement is made based on the original solution, thereby improving compatibility of this embodiment of this application.

In some possible implementations, if the first resource includes the resource used by the network device to send the first signal to the second relay device, the method further includes: receiving, by the first relay device on the third resource, a third signal sent by the first network device.

The first network device may send the third signal on the resource originally configured for the first relay device to send the second signal, thereby improving utilization of resources.

In some possible implementations, the time domain offset is at least one of at least one subframe, at least one half-subframe, and at least one slot.

The time domain offset may specifically be the at least one of the at least one subframe, the at least one half-subframe, and the at least one slot, so that the second relay device can determine the second resource more precisely.

In some possible implementations, before the sending, by the first relay device, a second signal on the second resource, the method further includes:

sending, by the first network device, first information to the first relay device; and determining, by the first relay device based on the first information, at least one of a time domain start moment, a time domain end moment, and period information of the second resource for transmitting the second signal.

The first network device determines, by using the first information, the at least one of the time domain start moment, the time domain end moment, and the period information of the second resource for transmitting the second signal, thereby enhancing flexibility of control signal transmission.

According to a sixth aspect, a communication method is provided, where the communication method includes:

receiving, by a network device, a timing advance (TA) request sent by a first relay device; and sending, by the network device, configuration signaling to the first relay device, where the configuration signaling is used by the first relay device to determine a first TA between the first relay device and the network device.

The network device receives the TA request sent by the first relay device, and requests the first TA between the first relay device and the network device for the first relay device based on the TA request. In this case, the network device can configure the first TA for the first relay device based on the request of the first relay device, thereby avoiding a case in which configuration is still performed when the first TA is not required. In this embodiment of this application, system resources are saved.

In some possible implementations, the first TA may be determined based on the TA request of the first relay device, or may be determined based on TA requests of a plurality of relay devices. In other words, this method may be applied to a communications system including a plurality of relay devices that directly communicate with a network device, and the network device can determine a TA of each of the plurality of relay devices, thereby improving signal processing efficiency.

In some possible implementations, the TA request carries a second TA, and the second TA is a TA that is requested by the first relay device and that is between the network device and the first relay device. The second TA may be a TA between the first relay device and the second relay device or a largest value among TAs between the first relay device and a plurality of relay devices. The sending, by the network device, configuration signaling to the first relay device based on the TA request includes: determining, by the network device, the first TA based on the second TA; and sending, by the network device, the configuration signaling to the first relay device, where the configuration signaling carries the first TA.

The network device receives the TA request that is sent by the first relay device and that carries the second TA, and configures the first TA between the first relay device and the network device for the first relay device by using the configuration signaling, thereby avoiding a collision between an uplink resource and a downlink resource that are used by the second relay device to transmit signals, and improving signal transmission efficiency.

In some possible implementations, the TA request carries a second TA. The second TA is a TA that is currently requested by the first relay device and that is between the network device and the first relay device, or the second TA is a TA between the first relay device and the second relay device, or the second TA is a largest value among TAs between the first relay device and a plurality of relay devices. The sending, by the network device, configuration signaling to the first relay device based on the TA request includes: determining, by the network device, the first TA based on the second TA; and sending, by the network device, the configuration signaling to the first relay device, where the configuration signaling carries a second TA offset value between the first TA and a third TA, and the third TA is a current TA between the network device and the first relay device.

The network device receives the TA request that is sent by the first relay device and that carries the second TA, and then configures the second TA offset value for the first relay device by using the configuration signaling, so that the first relay device can determine the first TA based on the second TA offset value. For example, the first relay device determines the first TA based on the third TA and the second TA offset value, and the first TA may specifically be a sum of the third TA and the second TA offset value or a difference between the third TA and the second TA offset value. Therefore, a collision between an uplink resource and a downlink resource that are used by the second relay device to transmit signals is avoided, and signal transmission efficiency is improved.

In some possible implementations, the TA request carries a first TA offset value between a second TA and a third TA. The second TA is a TA that is requested by the first relay device and that is between the network device and the first relay device, or the second TA is a TA between the first relay device and the second relay device, or the second TA is a largest value among TAs between the first relay device and a plurality of relay devices. The third TA is a current TA between the network device and the first relay device, and the sending, by the network device, configuration signaling to the first relay device based on the TA request includes: determining, by the network device, the first TA based on the first TA offset value; and sending, by the network device, the configuration signaling to the first relay device, where the configuration signaling carries the first TA.

The network device receives the TA request that is sent by the first relay device and that carries the first TA offset value between the second TA and the third TA, determines the first TA based on the first TA offset value, and configures the first TA between the first relay device and the network device for the first relay device by using the configuration signaling, thereby avoiding a collision between an uplink resource and a downlink resource that are used by the second relay device to transmit signals, and improving signal transmission efficiency.

In some possible implementations, the TA request carries a first TA offset value between a second TA and a third TA. The second TA is a TA that is currently requested by the first relay device and that is between the network device and the first relay device, or the second TA is a TA between the first relay device and the second relay device, or the second TA is a largest value among TAs between the first relay device and a plurality of relay devices. The third TA is a current TA between the network device and the first relay device, and the sending, by the network device, configuration signaling to the first relay device based on the TA request includes: determining, by the network device, a second TA offset value between the first TA and the third TA based on the first TA offset value; and sending, by the network device, the configuration signaling to the first relay device, where the configuration signaling carries the second TA offset value.

The network device receives the TA request that is sent by the first relay device and that carries the first TA offset value between the second TA and the third TA, and then configures the second TA offset value for the first relay device by using the configuration signaling, so that the first relay device can determine the first TA based on the second TA offset value. The second TA offset value may be determined based on the first TA offset value. For example, the first relay device determines the first TA based on the third TA and the second TA offset value, and the first TA may specifically be a sum of the third TA and the second TA offset value or a difference between the third TA and the second TA offset value. Therefore, a collision between an uplink resource and a downlink resource that are used by the second relay device to transmit signals is avoided, and signal transmission efficiency is improved.

In some possible implementations, the TA request may be further determined based on the second TA or by using another method.

In some possible implementations, the sending, by the network device, configuration signaling to the first relay device includes:

sending, by the network device to the first relay device, at least one of a broadcast message, a system message, a master message block, and a system message block that include the configuration signaling, where the system message may be a remaining minimum system message (Remaining minimum system information, RMSI).

The network device may add the configuration signaling to the at least one of the broadcast message, the system message, the master message block, and the system message block, thereby reducing system power consumption.

According to a seventh aspect, a communication method is provided, where the communication method includes: sending, by a first relay device, a timing advance TA request to a network device; receiving, by the first relay device, configuration signaling sent by the network device, where the configuration signaling is determined by the network device based on the TA request; and determining, by the first relay device, a first TA between the first relay device and the network device based on the configuration signaling.

The first relay device sends the TA request to the network device, receives the configuration signaling determined by the network device based on the TA request, and determines the first TA between the first relay device and the network device based on the configuration signaling. In other words, the network device configures the first TA based on the request of the first relay device, thereby avoiding a case in which configuration is still performed when the first TA is not required. In this embodiment of this application, system resources are saved.

In some possible implementations, a plurality of relay devices connected to the network device each may send a TA request to the network device, to determine a TA value corresponding to each TA request. In other words, this method may be applied to a communications system including a plurality of relay devices that directly communicate with a network device, and the network device can determine a TA of each of the plurality of relay devices, thereby improving signal processing efficiency.

In some possible implementations, the TA request carries a second TA between the first relay device and the second relay device. Alternatively, the second TA is a TA that is currently requested by the first relay device and that is between the network device and the first relay device. Alternatively, the second TA is a largest value among TAs between the first relay device and a plurality of relay devices. The configuration signaling carries the first TA, and the first TA is determined by the network device based on the second TA.

The first relay device sends the TA request that carries the second TA between the first relay device and the second relay device, so that based on the second TA, the network device adjusts a current TA between the network device and the first relay device and determines the first TA. The first relay device receives the configuration signaling that carries the first TA, thereby avoiding a collision between an uplink resource and a downlink resource that are used by the second relay device to transmit signals, and improving signal transmission efficiency.

In some possible implementations, the TA request carries a second TA. The second TA is a TA that is currently requested by the first relay device and that is between the network device and the first relay device, or the second TA is a TA between the first relay device and the second relay device, or the second TA is a largest value among TAs between the first relay device and a plurality of relay devices. The configuration signaling carries a second TA offset value between the first TA and a third TA. The third TA is a current TA between the network device and the first relay device, and the first TA is determined by the network device based on the second TA.

The first relay device sends the TA request that carries the second TA, so that the network device determines the first TA based on the second TA. The first relay device receives the configuration signaling that carries the first TA, thereby avoiding a collision between an uplink resource and a downlink resource that are used by the second relay device to transmit signals, and improving signal transmission efficiency.

In some possible implementations, the TA request carries a first TA offset value between a second TA and a third TA. The second TA is a TA that is currently requested by the first relay device and that is between the network device and the first relay device, or the second TA is a TA between the first relay device and the second relay device, or the second TA is a largest value among TAs between the first relay device and a plurality of relay devices. The first TA is determined by the network device based on the first TA offset value.

The first relay device sends the TA request that carries the first TA offset value between the second TA and the third TA to the network device, determines the first TA based on the first TA offset value, and configures the first TA between the first relay device and the network device for the first relay device by using the configuration signaling, thereby avoiding a collision between an uplink resource and a downlink resource that are used by the second relay device to transmit signals, and improving signal transmission efficiency.

In some possible implementations, the TA request carries a first TA offset value between a second TA and a third TA. The second TA is a TA between the first relay device and the second relay device, and the third TA is a current TA between the network device and the first relay device. The configuration signaling carries a second TA offset value between the first TA and the third TA, and the second TA offset value is determined by the network device based on the first TA offset value. The determining, by the first relay device, a first TA between the first relay device and the second relay device based on the configuration signaling includes: determining, by the first relay device, the first TA based on the second TA offset value and the third TA.

The first relay device sends the TA request that carries the first TA offset value between the second TA and the third TA, so that the network device determines the second TA offset value based on the TA request, and configures the second TA offset value for the first relay device by using the configuration signaling, and the first relay device can determine the first TA based on the second TA offset value and the third TA, thereby avoiding a collision between an uplink resource and a downlink resource that are used by the second relay device to transmit signals, and improving signal transmission efficiency.

In some possible implementations, the receiving, by the first relay device, configuration signaling sent by the network device includes:

receiving, by the first relay device, at least one of a broadcast message, a system message, a master message block, and a system message block that include the configuration signaling and that are sent by the network device.

The first relay device receives the configuration signaling added by the network device to the at least one of the broadcast message, the system message, the master message block, and the system message block, thereby reducing system power consumption.

According to an eighth aspect, a network device is provided, where the network device includes a module configured to perform the method according to the first aspect or any one of the possible implementations of the first aspect.

According to a ninth aspect, a relay device is provided, where the relay device includes a module configured to perform the method according to the second aspect or any one of the possible implementations of the second aspect.

According to a tenth aspect, another relay device is provided, where the relay device includes a module configured to perform the method according to the third aspect or any one of the possible implementations of the third aspect.

According to an eleventh aspect, another network device is provided, where the network device includes a module configured to perform the method according to the fourth aspect or any one of the possible implementations of the fourth aspect.

According to a twelfth aspect, a system is provided, where the system includes the network device according to the eighth aspect and the relay device according to the ninth aspect.

According to a thirteenth aspect, another system is provided, where the system includes:

the relay device according to the tenth aspect and the network device according to the eleventh aspect.

According to a fourteenth aspect, still another system is provided, where the system includes:

the network device according to the eighth aspect, the relay device according to the ninth aspect, the relay device according to the tenth aspect, and the network device according to the eleventh aspect.

According to a fifteenth aspect, a network device is provided, including:

a processor, a memory, and a communications interface, where the processor and the memory are connected to the communications interface. The memory is configured to store an instruction, the processor is configured to execute the instruction, and the communications interface is configured to communicate with another network element under control of the processor. When the processor executes the instruction stored in the memory, the execution enables the processor to perform the method according to the first aspect or any one of the possible implementations of the first aspect.

According to a sixteenth aspect, a relay device is provided, including:

a processor, a memory, and a communications interface, where the processor and the memory are connected to the communications interface. The memory is configured to store an instruction, the processor is configured to execute the instruction, and the communications interface is configured to communicate with another network element under control of the processor. When the processor executes the instruction stored in the memory, the execution enables the processor to perform the method according to the second aspect or any one of the possible implementations of the second aspect.

According to a seventeenth aspect, a computer storage medium is provided. The computer storage medium stores program code, and the program code is used to indicate an instruction for performing the method according to the first aspect or any one of the possible implementations of the first aspect.

According to an eighteenth aspect, a computer storage medium is provided. The computer storage medium stores program code, and the program code is used to indicate an instruction for performing the method according to the second aspect or any one of the possible implementations of the second aspect.

According to a nineteenth aspect, a relay device is provided, including:

a processor, a memory, and a communications interface, where the processor and the memory are connected to the communications interface. The memory is configured to store an instruction, the processor is configured to execute the instruction, and the communications interface is configured to communicate with another network element under control of the processor. When the processor executes the instruction stored in the memory, the execution enables the processor to perform the method according to the third aspect or any one of the possible implementations of the third aspect.

According to a twentieth aspect, a network device is provided, including:

a processor, a memory, and a communications interface, where the processor and the memory are connected to the communications interface. The memory is configured to store an instruction, the processor is configured to execute the instruction, and the communications interface is configured to communicate with another network element under control of the processor. When the processor executes the instruction stored in the memory, the execution enables the processor to perform the method according to the fourth aspect or any one of the possible implementations of the fourth aspect.

According to a twenty-first aspect, a computer storage medium is provided. The computer storage medium stores program code, and the program code is used to indicate an instruction for performing the method according to the third aspect or any one of the possible implementations of the third aspect.

According to a twenty-second aspect, a computer storage medium is provided. The computer storage medium stores program code, and the program code is used to indicate an instruction for performing the method according to the fourth aspect or any one of the possible implementations of the fourth aspect.

According to a twenty-third aspect, another network device is provided, where the network device includes a module configured to perform the method according to the sixth aspect or any one of the possible implementations of the sixth aspect.

According to a twenty-fourth aspect, another relay device is provided, where the relay device includes a module configured to perform the method according to the seventh aspect or any one of the possible implementations of the seventh aspect.

According to a twenty-fifth aspect, a system is provided, where the system includes:

the network device according to the twenty-third aspect and the relay device according to the twenty-fourth aspect.

According to a twenty-sixth aspect, a network device is provided, including:

a processor, a memory, and a communications interface, where the processor and the memory are connected to the communications interface. The memory is configured to store an instruction, the processor is configured to execute the instruction, and the communications interface is configured to communicate with another network element under control of the processor. When the processor executes the instruction stored in the memory, the execution enables the processor to perform the method according to the sixth aspect or any one of the possible implementations of the sixth aspect.

According to a twenty-seventh aspect, a relay device is provided, including:

a processor, a memory, and a communications interface, where the processor and the memory are connected to the communications interface. The memory is configured to store an instruction, the processor is configured to execute the instruction, and the communications interface is configured to communicate with another network element under control of the processor. When the processor executes the instruction stored in the memory, the execution enables the processor to perform the method according to the seventh aspect or any one of the possible implementations of the seventh aspect.

According to a twenty-eighth aspect, a computer storage medium is provided. The computer storage medium stores program code, and the program code is used to indicate an instruction for performing the method according to the sixth aspect or any one of the possible implementations of the sixth aspect.

According to a twenty-ninth aspect, a computer storage medium is provided. The computer storage medium stores program code, and the program code is used to indicate an instruction for performing the method according to the seventh aspect or any one of the possible implementations of the seventh aspect.

According to a thirtieth aspect, a system chip is provided. The system chip includes an input/output interface, at least one processor, at least one memory, and a bus. The at least one memory is configured to store an instruction, and the at least one processor is configured to invoke the instruction in the at least one memory, to perform operations of the methods according to the foregoing aspects.

According to another aspect of this application, a computer program product including an instruction is provided. When the computer program product runs on a computer, the computer is enabled to perform the methods according to the foregoing aspects.

According to the foregoing solutions, the first network device determines the first resource including the resource used by the second network device to send the first signal to the second relay device, and sends the first configuration information to the first relay device, so that the first relay device determines the second resource that is for sending the second signal and that is in the first resource based on the first configuration information, and sends the second signal on the second resource. In this case, the second relay device can receive the second signal on the part or all of the first resource. That is, the second relay device discovers the first relay device, thereby improving signal transmission efficiency.

DESCRIPTION OF EMBODIMENTS

The following describes technical solutions of this application with reference to accompanying drawings.

The technical solutions of the embodiments of this application may be applied to various communications systems, such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or a new radio system.

A terminal device in the embodiments of this application may be user equipment, an access terminal, a subscriber unit, a subscriber station, a mobile station, a mobile station, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a future 5G network, a terminal device in a future evolved public land mobile network (PLMN), or the like. This is not limited in the embodiments of this application.

A network device in the embodiments of this application may be a device configured to communicate with the terminal device. The network device may be a base transceiver station (BTS) in the global system for mobile communications (GSM) or the code division multiple access (CDMA) system, or may be a NodeB (NB) in the wideband code division multiple access (WCDMA) system, or may be an evolved NodeB (eNodeB) in the LTE system, or may be a radio controller in a cloud radio access network (CRAN) scenario. Alternatively, the network device may be a relay node, an access point, a vehicle-mounted device, a wearable device, a network device in the future 5G network, a network device in the future evolved PLMN network, or the like. This is not limited in the embodiments of this application.

Figure 1:
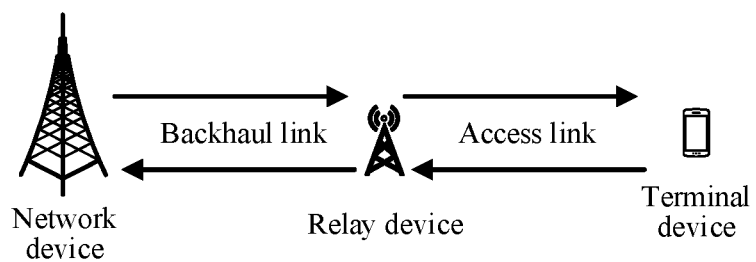
FIG. 1 shows an application scenario according to an embodiment of this application.

FIG. 1 shows an application scenario according to an embodiment of this application. As shown in FIG. 1, there are three types of nodes: a network device, a relay device, and a terminal device in a relay system. A link between the network device and the relay device may be referred to as a "backhaul (BH) link", and a link between the relay device and the terminal device may be referred to as an "access (AC) link". In an LTE system, to maintain compatibility with users in an early system, the relay device is made invisible to the terminal device. Therefore, a design of the AC link reuses the design of a single-hop link in LTE, and design is performed for the BH link.

Figure 2:
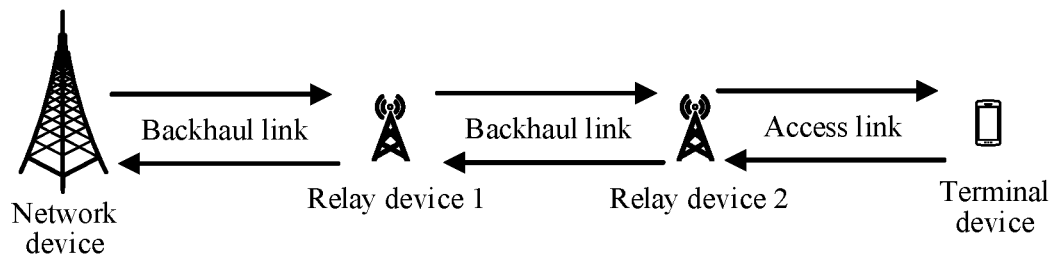
FIG. 2 shows another application scenario according to an embodiment of this application.

FIG. 2 shows another application scenario according to an embodiment of this application. As shown in FIG. 2, a communications system may include a plurality of relay devices. A network device communicates with a terminal device through the plurality of relay devices (for example, a relay device 1 and a relay device 2 in FIG. 2). A link between the relay device 1 and the relay device 2 may also be referred to as a "backhaul link".

It should be understood that the number of relay devices is not limited in the embodiments of this application.

It should be further understood that, this application imposes no limitation on the names of the link between the network device and a relay device, the link between two relay devices, and the link between the terminal device and a relay device.

Specifically, resources of the BH link and the AC link in the communications system are time division resources. The network device configures resources of a multicast-broadcast single-frequency network (MBSFN) subframe for the AC link, and configures blank resources in the MBSFN subframe for the BH link, so that transmission can be performed on the BH link to ensure that the BH link is transparent to a user.

A manner of performing resource configuration for the BH link in the communications system is shown in Table 1.

TABLE 1

| TDD subframe configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | | | | | D | | | U | | |
| 1 | | U | | | | | | | | D |
| 2 | | | | D | | | | | U | D |
| 3 | | | U | D | | | | | | D |
| 4 | | | U | D | | | | | U | D |
| 5 | U | | | | | | | D | | |
| 6 | | | D | | | U | | | | |
| 7 | | U | | D | | | | D | | |
| 8 | | | D | | | U | | | | D |
| 9 | U | D | D | | | | | D | | |
| 10 | | D | | | | | U | D | D | |
| 11 | | U | | | | | D | | D | |
| 12 | | U | | | | | D | D | D | |
| 13 | | U | | | | | | | | D |
| 14 | | U | | | | | D | | | D |
| 15 | | U | | | | | | | D | D |
| 16 | | U | | | | | D | D | D | |
| 17 | | U | D | | | | D | D | D | |
| 18 | | | U | | | | | | | D |

Figure 3:
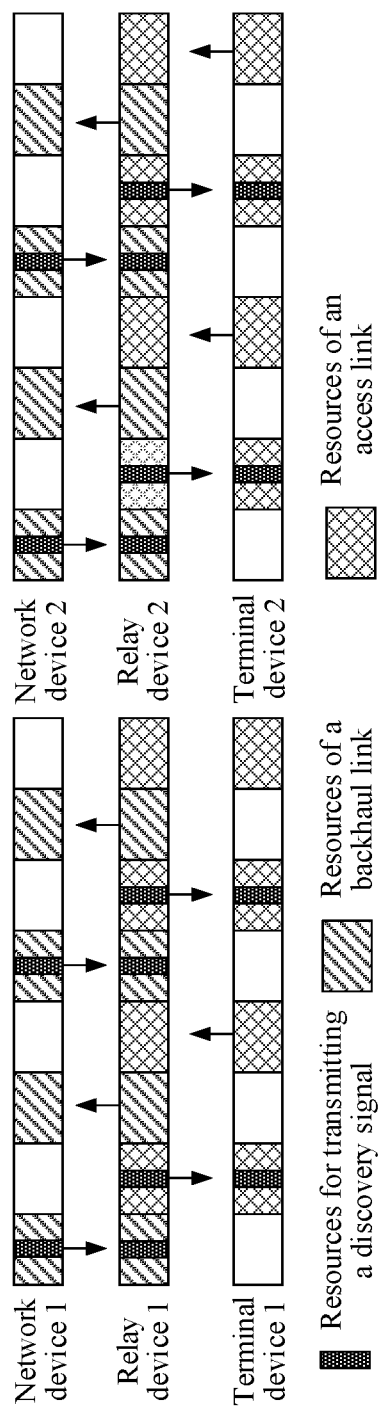
FIG. 3 is a schematic diagram of a communication method in a conventional solution.

It can be learned from Table 1 that, all resources of the access link include subframes, namely, a subframe 0 and a subframe 5 in which synchronization signals are located. In this case, as shown in FIG. 3, if two different relay devices each are sending or receiving a synchronization signal in the same subframe, neither of the relay devices can discover each other because the relay devices do not have a capability of simultaneously sending and receiving signals.

Figure 4:
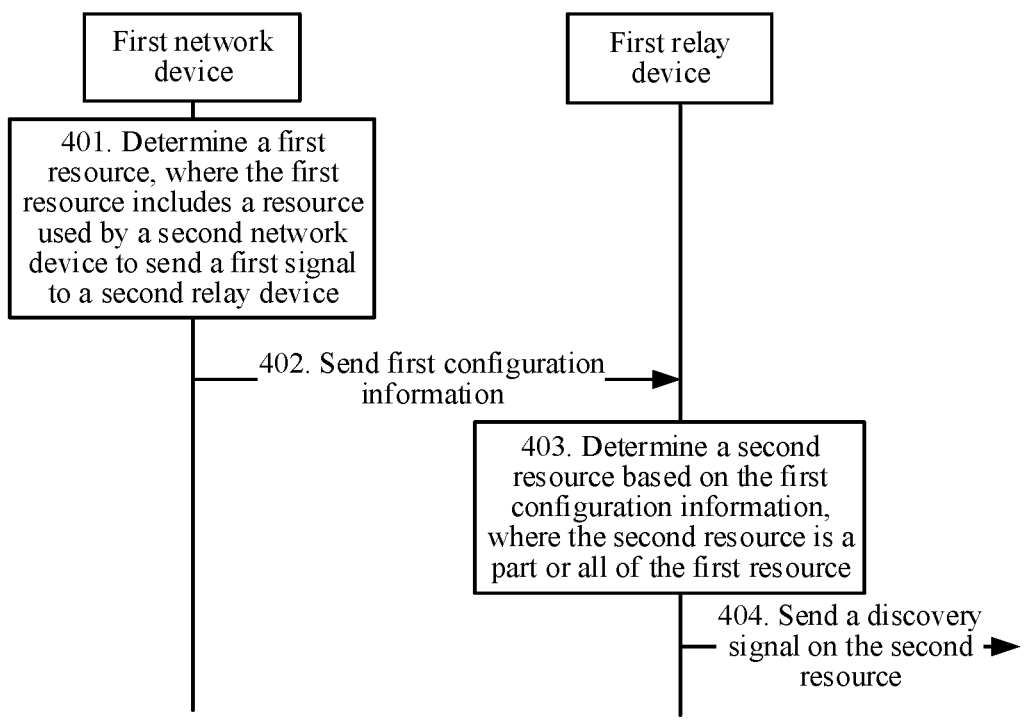
FIG. 4 is a schematic flowchart of a communication method according to an embodiment of this application.

FIG. 4 is a schematic flowchart of a communication method according to an embodiment of this application.

The communication method may be applied to a communications system including a first network device, a second network device, and at least two relay devices. For ease of description, the following embodiment is described by using an example in which a first relay device in the at least two relay devices is within a coverage area of the first network device, and a second relay device in the at least two relay devices is within a coverage area of the second network device.

It should be noted that, the second relay device may be any one of the at least two relay devices. The first relay device may be any relay device other than the second relay device in the communications system.

Optionally, the first network device and the second network device may be two micro base stations in different cells within a coverage area of one base station. Alternatively, the first network device and the second network device may be two devices that are not related to each other. Alternatively, the first network device and the second network device may be the same network device. This is not limited in this application.

Optionally, the first relay device may also be within the coverage area of the second network device, and the second relay device may also be within the coverage area of the first network device. This is not limited in this application.

Optionally, the communications system may further include at least one terminal device. This embodiment of this application is described by using an example in which a first terminal device is within a coverage area of the first relay device, and a second terminal device is within a coverage area of the second relay device.

Optionally, the first terminal device and the second terminal device may be a same terminal device. This is not limited in this application.

Optionally, the first network device and the second network device each may alternatively be a relay device configured of a resource allocation function. This is not limited in this application.

Optionally, the first relay device and the second relay device each may alternatively be a terminal device in this embodiment of this application. For example, a mobile phone may be used as a relay device for a wearable device. This is not limited in this application.

401. The first network device determines a first resource, where the first resource includes a resource used by the second network device to send a first signal to the second relay device.

If the first network device and the second network device are a first micro base station and a second micro base station respectively, in two different cells within a coverage area of a base station, the first micro base station may determine, by using information sent by the base station, the resource used by the second micro base station to send the first signal to the second relay device. If the first network device and the second network device are two devices that are not related to each other, the first network device may learn the first resource through a relay device or in another manner. This is not limited in this application.

The first signal may be a synchronization signal, or may be another signal having a discovery function, for example, a channel state information (CSI)-reference signal (RS), a demodulation reference signal (DMRS), a tracking RS, a DMRS of a physical broadcast channel (PBCH), a sounding reference signal (SRS), or a phase tracking reference signal (PT-RS), or the foregoing signal with zero power. For ease of description, the following embodiment is described by using an example in which the signal is a synchronization signal. The first resource may be a time domain resource used to transmit the signal, or may be a frequency domain resource used to transmit the signal, or may be a frequency domain resource and a time domain resource that are used to transmit the signal. This is not limited in this application.

Optionally, the second network device may send, to the second relay device, configuration information used to indicate the resource for sending the first signal. Specifically, the second network device may configure at least one of a time domain start moment, a time domain end moment, and period information of the resource for sending the first signal. For example, when the first signal is a signal with non-zero power, the resource for sending the first signal may be a part of the first resource. Because the second relay device performs signal reception on the first resource, the second relay device may discover another device by receiving a second signal mapped to a resource in the first resource except the resource occupied by the first signal. For example, the first signal is a synchronization signal, and the first resource is a slot in which the first signal is located. For another example, when the first signal is a signal with zero power, the resource for sending the first signal may be the first resource or a part of the first resource. The second relay device may discover another device by receiving a second signal on a resource of the first signal with zero power. For example, the first signal is a synchronization signal with zero power. Optionally, when the resource occupied by the first signal is a part of the first resource, a resource in the first resource except the resource occupied by the first signal may be further used to protect a resource, to avoid interference caused by signal arrival time offset that are caused by different transmission latencies of devices.

The second signal may be a synchronization signal, or may be another signal having a discovery function, for example, a channel state information (CSI)-reference signal (RS), a demodulation reference signal (DMRS), a tracking RS, a DMRS of a physical broadcast channel (PBCH), a sounding reference signal (SRS), or a phase tracking reference signal (PT-RS).

Optionally, the second network device may send the first signal to the second relay device on the first resource, so that the second relay device can receive, on the first resource, the first signal sent by the second network device.

402. The first network device sends first configuration information to the first relay device, where the first configuration information is used by the first relay device to determine a second resource for sending the second signal, and the second resource is a part or all of the first resource. Correspondingly, the first relay device receives, on the first resource, the first configuration information sent by the first network device.

It should be understood that, the second signal may be the same as or different from the first signal. This is not limited in this application.

It should be further understood that, in this embodiment of this application, a method in which the first network device sends the first configuration information to the first relay device to configure the second resource for sending the second signal may be further applied to configuration of another resource in another solution. This is not limited in this application. For example, in this embodiment of this application, the second resource that is for sending the second signal and that is configured by using the first configuration information sent by the first network device to the first relay device may further include a resource other than the first resource, or there is no limitation on a relationship between the second resource and the first resource, so that the first network device can directly configure the first device to send one or more second signals. For example, the first network device may configure period information of one second signal or periods of a plurality of second signals, so that one or more other devices can detect the first relay device.

Optionally, the first configuration information may directly indicate the second resource used by the first relay device to send the second signal.

It should be noted that, the first configuration information may explicitly or implicitly indicate the second resource. This is not limited in this application.

For example, the first configuration information indicates a resource location of the second resource, or the first configuration information indicates an index of a resource location of the second resource.

Optionally, the first network device may alternatively send the first configuration information to indicate a third resource used by the first relay device to send the second signal. Then, the first network device may send second configuration information to indicate a time domain offset of the third resource, so that the first relay device determines, based on the third resource and the time domain offset, a final resource for sending the second signal. Optionally, in this configuration, the second signal is not transmitted on the third resource.

Optionally, the first relay device may alternatively predefine a third resource for sending the second signal. In other words, the first network device does not need to send the first configuration information to indicate the third resource for sending the second resource. In this case, in this embodiment of this application, a resource configuration for sending the second signal in an original solution is compatible, and improvement is made based on the original solution, thereby improving compatibility of this embodiment of this application. Optionally, in this configuration, the second signal is not transmitted on the third resource.

Optionally, the third resource may further be a resource determined through resource allocation for a previous signal transmission.

Optionally, the time domain offset may be at least one of at least one subframe, at least one half-subframe, at least one slot, and at least one orthogonal frequency division multiplexing (OFDM) technology symbol.

Figure 5:
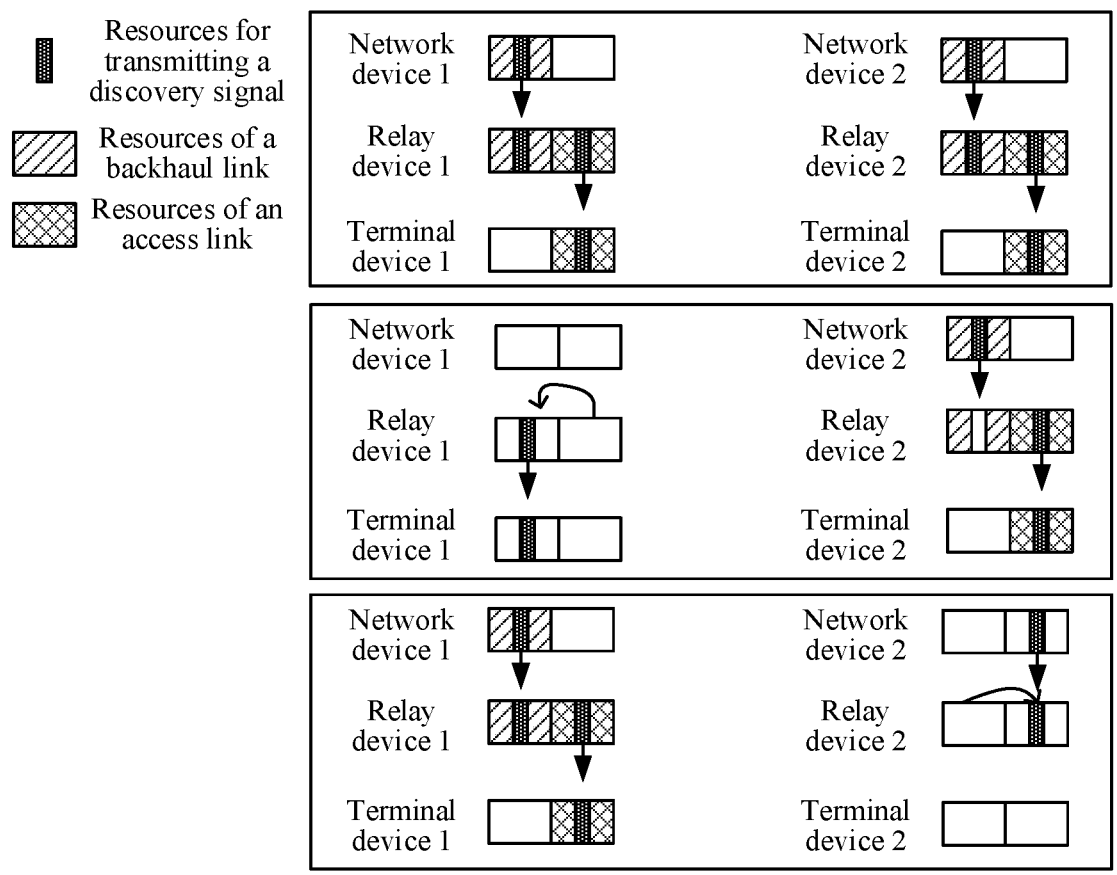
FIG. 5 is a schematic diagram of another communication method according to an embodiment of this application.

Optionally, the first network device may predefine a resource for sending the first signal and/or may predefine a resource used by the first relay device to send the second signal. Likewise, the second network device may alternatively predefine a resource for sending the first signal and a resource used by the second relay device to send the second signal, as shown in FIG. 5. In this embodiment of this application, a resource that is used by the second network device to send the first signal to the second relay device and that is determined by the first network device may be the resource predefined by the second network device for sending the first signal. Alternatively, after predefining the resource for sending the first signal, the second network device sends configuration information to perform resource offset. Specifically, the resource predefined for sending the first signal may be offset to the predefined resource used by the second relay device to send the second signal.

Optionally, the first network device may configure only the resource used by the first relay device to send the second signal, to be offset.

Optionally, the first network device may also configure a location of a time unit in which the first relay device communicates with the second relay device. The time unit may be a subframe, a mini-slot, a slot, a subframe, or a half-subframe. That the first network device configures the location of the first time unit in which the first relay device communicates with the second relay device may be establishing a correspondence between the second time unit in which the first network device communicates with the first relay device and the first time unit in which the first relay device communicates with the second relay device, or may be configuring an offset value of the first time unit relative to the second time unit, or may be configuring an offset value of the first time unit. The first relay device determines the first time unit based on the second time unit and the correspondence between the second time unit and the first time unit. Alternatively, the first relay device determines the first time unit based on the second time unit and the offset value of the first time unit relative to the second time unit. Alternatively, the first relay device determines the first time unit based on a current time unit in which the first relay device communicates with the second relay device and the offset value of the first time unit. Optionally, the first time unit may alternatively be an identifier of the first time unit, and the second time unit may alternatively be an identifier of the second time unit.

Figure 6:
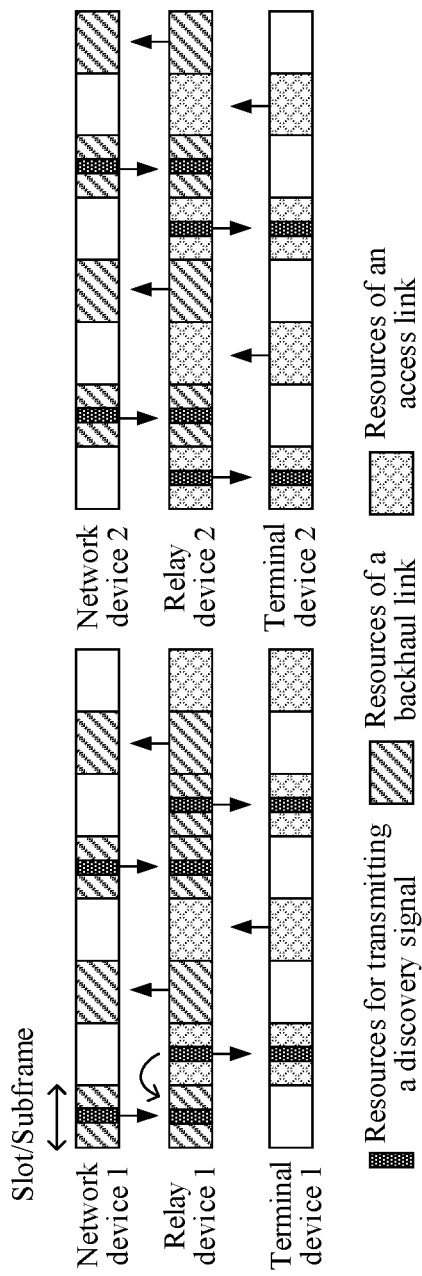
FIG. 6 is a schematic diagram of still another communication method according to an embodiment of this application.

For example, as shown in FIG. 6, a network device 1 offsets a slot in which a time domain resource for sending a first signal to a relay device 1 is located to a slot in which a resource used by the relay device 1 to send a second signal to a terminal device 1 is located.

Optionally, the first network device may send a third signal to the first relay device on the third resource. In other words, the first network device may send the third signal on the resource originally configured for the first relay device to send the second signal, thereby improving utilization of resources.

It should be understood that, the third signal may be the same as the first signal that the second network device sends on the first resource. This is not limited in this application.

Optionally, the second resource may be a predefined resource configured by the first network device for the third signal. In this case, the first network device sends the third signal to the second relay device on the second resource. In other words, the first network device configures interchange of locations between the resource used by the first network device to send the third signal to the first relay device and the resource used by the first relay device to send the second signal.

It should be noted that, interchange of locations between resources means that signal transmission functions of the resources are changed. In other words, a resource originally predefined to transmit a signal A is currently used to transmit a signal B; or a resource for transmitting a signal A over a first backhaul link is used to transmit a signal B over a second backhaul link.

Figure 7:
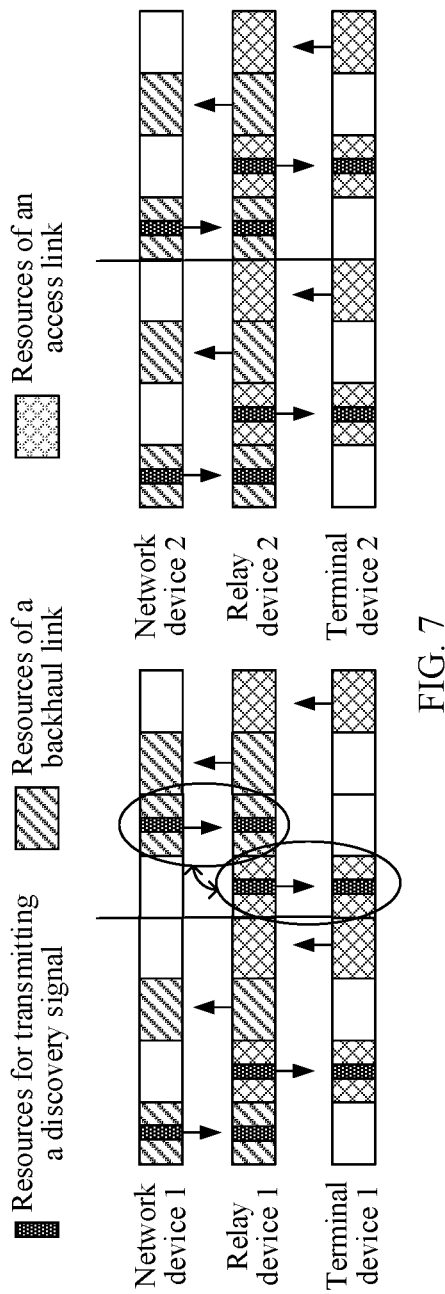
FIG. 7 is a schematic diagram of yet another communication method according to an embodiment of this application.

Optionally, the interchange of the locations between the resources may alternatively be an interchange of a slot in which a time domain resource used by the first network device to send the third signal is located and a slot in which a time domain resource used by the first relay device to send the second signal is located, as shown in FIG. 7.

Optionally, that the first network device sends first configuration information to the first relay device may be via higher layer signaling, and the higher layer signaling carries the first configuration information.

Specifically, the higher layer signaling may be at least one of radio resource control (RRC), a media access control (MAC) control element (CE), a broadcast message, and a system message.

Optionally, the first network device may further send first information to the first relay device. The first information is used by the first relay device to determine at least one of a time domain start moment, a time domain end moment, and period information of the second resource for transmitting the second signal.

Optionally, the first information may be further used to configure at least one of time domain start moments, time domain end moments, and period information of a plurality of second signals, so that the first relay device may send a plurality of second signals. For example, the periods of the plurality of second signals may be configured, which may help a plurality of devices discover the first relay device.

Specifically, if the first resource includes a predefined resource used by the first network device to send the first signal to the first relay device, the first information may be used to trigger the second relay device to start to send the second signal on the first resource at a particular time, or may be used to trigger the second relay device to stop sending the second signal on the first resource at a particular time.

It should be understood that, the first information may be referred to as "trigger signaling". This is not limited in this application.

Optionally, the trigger signaling may trigger the first relay device only to start to send the second signal on the first resource at a particular time, and the first relay device stops sending a next signal on the first resource at the end of the predefined maximum duration.

Optionally, the trigger signaling may trigger the first relay device only to start to send the second signal on the first resource at the moment, and the trigger signaling carries the time period information. The second relay device stops sending the second signal on the first resource at the end of this period, and starts to send a next signal on the first resource in the next period.

Optionally, the trigger signaling may alternatively trigger interchange of the resource used by the first network device to send the first signal and the resource used by the first relay device to send a next signal.

Optionally, the trigger signaling is alternatively used to trigger a time domain start moment and/or a time domain end moment of interchange of resources, and carry interchange period information. This is not limited in this application.

Optionally, the trigger signaling may alternatively be used to trigger a start moment of interchange of resources, and predefine maximum duration of the interchange of the resources.

403. The first relay device determines the second resource based on the first configuration information, where the second resource is a part or all of the first resource.

Optionally, when the first configuration information is used to indicate the second resource, the first relay device may directly determine the second resource in the first resource based on the first configuration information.

Optionally, if the first configuration information is used to indicate the third resource used by the first relay device to send the second signal, the first relay device may further receive the second configuration information. The second configuration information is used to indicate the time domain offset between the third resource and the second resource, so that the first relay device can determine the second resource based on the third resource and the time domain offset.

404. The first relay device sends the second signal on the second resource. Correspondingly, the second relay device receives the second signal on the second resource.

The second relay device may determine the first resource based on the first configuration information. In this case, the network device configures the time domain offset, so that a resource used by the network device to send the first signal to the first relay device is the same as a resource used by the second relay device to send the second signal. Therefore, the first relay device can receive the first signal and the second signal on the first resource, that is, the first relay device can discover the second relay device.

Optionally, the first relay device may further receive the trigger signaling, and determines, based on the trigger signaling, the at least one of the time domain start moment, the time domain end moment, and the period information of the second resource for transmitting the second signal.

Optionally, the second network device may send third configuration information to the second relay device to indicate the first resource, so that the second relay device can receive, on the part or all of the first resource, the second signal sent by the first relay device. Optionally, the third configuration information may also be carried by higher layer signaling.

Optionally, the second relay device may further receive the first signal sent by the second network device. That is, the second relay device can simultaneously receive the first signal and the second signal.

Optionally, the first relay device sends the second signal on the first resource, and the first terminal device may also receive the second signal.

Optionally, the second network device may send a plurality of signals or resources for sending a plurality of signals to the second relay device. A resource for sending each of the plurality of signals may be inconsecutive. The first network device may determine a resource for sending one or more of the signals, and configure, based on the configuration information sent in the foregoing embodiments, the resource for sending the one or more of the signals for the first relay device to send another signal. Therefore, the second relay device can discover the first relay device, thereby improving reliability of device discovery. The second relay device can also discover different relay devices that send signals in different periods. For example, the resources for sending the signals each may be the resource used by the second network device to send the first signal to the second relay device in the foregoing embodiments, or may include the resource configured by the second network device for the first signal with zero power. For example, the other signal may be the second signal in the foregoing embodiments.

It should be understood that, one or more signals configured by the second network device for the second relay device or a resource that is for sending one or more signals and that is configured by the second network device for the second relay device may not include a part or all of the second resource; or one or more signals configured by the second network device for the second relay device or a resource that is for sending one or more signals and that is configured by the second network device for the second relay device are/is unrelated to the second resource. For example, the second network device may configure a resource of one or more first signals with zero power, such as at least one of a time-frequency resource of the one or more first signals, a period, a start time, and an end time of the resource of the one or more first signals, so that the second relay device can receive one or more signals on the second resource, to discover one or more other devices.

Therefore, according to the communication method in this embodiment of this application, the first network device determines the first resource including the resource used by the second network device to send the first signal to the second relay device, and sends the first configuration information to the first relay device. The first relay device determines the second resource that is used by the first relay device to send the second signal and that is in the first resource based on the first configuration information, and sends the second signal on the second resource. In this case, the second relay device can receive the second signal on the part or all of the first resource. That is, the second relay device discovers the first relay device, thereby improving signal transmission efficiency.

Figure 8:
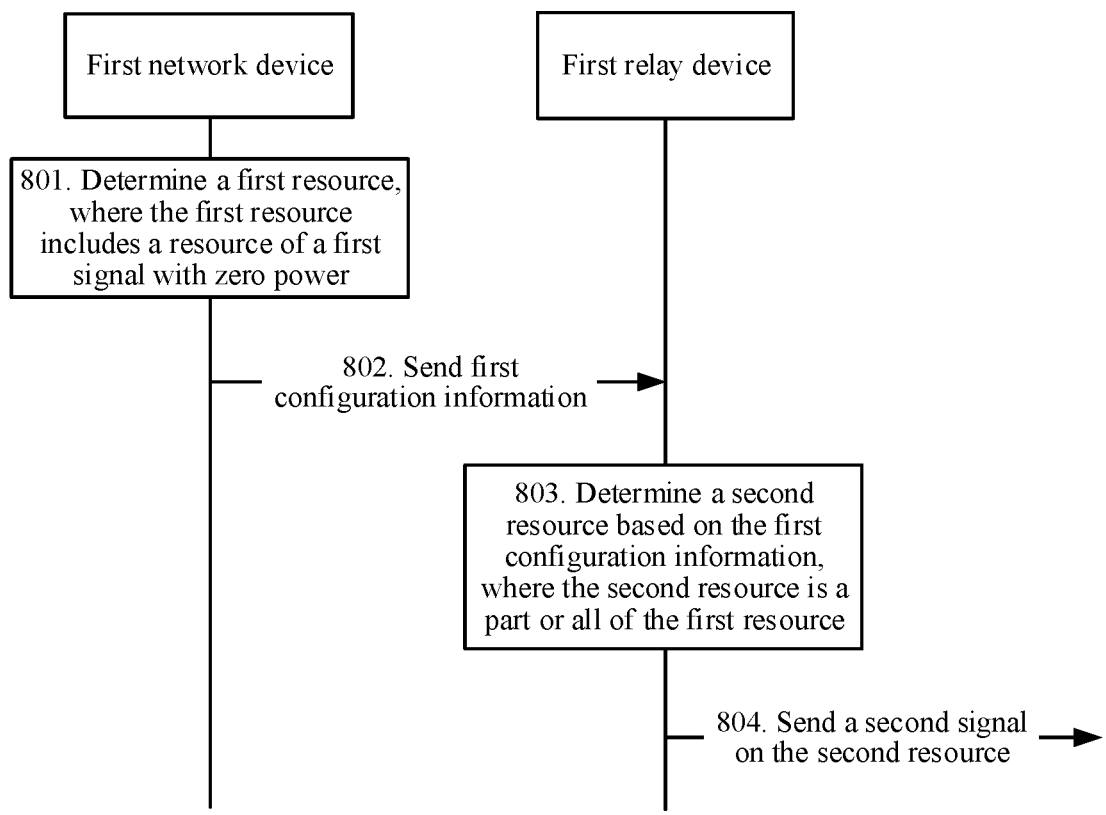
FIG. 8 is a schematic flowchart of another communication method according to an embodiment of this application.

FIG. 8 is a schematic flowchart of a communication method according to an embodiment of this application.

The communication method may be applied to a same communications system as that in the embodiment shown in FIG. 4. To avoid repetition, details are not described herein.

801. A first network device determines a first resource, where the first resource includes a resource of a first signal with zero power.

The resource of the first signal with zero power may be a predefined resource including a resource predefined by a second network device to transmit a first signal. However, the second network device does not send the first signal on the predefined resource.

It should be noted that, a time domain coverage range of the first resource may be greater than a time domain coverage range of the resource of the first signal with zero power, and excess time domain resources may be used to switch sending and receiving of signals.

The first signal may be a synchronization signal, or may be another signal having a discovery function, for example, a channel state information (CSI)-reference signal (RS), a demodulation reference signal (DMRS), a tracking RS, a DMRS of a physical broadcast channel (PBCH), a sounding reference signal (SRS), or a phase tracking reference signal (PT-RS), or the foregoing signal with zero power. For ease of description, the following embodiment is described by using an example in which the signal is a synchronization signal. The first resource may be a time domain resource used to transmit a signal, or may be a frequency domain resource used to transmit a signal, or may be a frequency domain resource and a time domain resource that are used to transmit a signal. This is not limited in this application.

Optionally, the first resource may alternatively include a predefined resource configured by the second network device for the first signal.

Optionally, the first resource may alternatively include a resource obtained after a predefined resource used by the second network device to send the first signal is offset in time domain.

Optionally, a time domain offset of a resource used by the second network device to send the first signal to a second relay device is different from a time domain offset of a resource used by the second network device to send a third signal to the second relay device, thereby ensuring that each second relay device can still be synchronous with the second network device.

Optionally, the second network device may set a period of a first resource for each relay device, to reduce a probability that a resource of a first signal with zero power occurs, and ensure that each second relay device can still be synchronous with the second network device.

802. The first network device sends first configuration information to a first relay device, where the first configuration information is used by the first relay device to determine a second resource for sending a second signal.

The second signal may be a synchronization signal, or may be another signal having a discovery function, for example, a channel state information (CSI)-reference signal (RS), a demodulation reference signal (DMRS), a tracking RS, a DMRS of a physical broadcast channel (PBCH), a sounding reference signal (SRS), or a phase tracking reference signal (PT-RS).

Optionally, the first configuration information may directly indicate the resource of the first signal with zero power.

Optionally, when the first configuration information is used to indicate a third resource used by the first relay device to send the second signal, the first network device may further send second configuration information to the first relay device, where the second configuration information is used to indicate a time domain offset between the third resource and the second resource.

Optionally, that the first network device sends first configuration information to a first relay device may be sending higher layer signaling, and the higher layer signaling carries the first configuration information.

Specifically, the higher layer signaling may be at least one of radio resource control (RRC), a media access control (MAC) control element (CE), a broadcast message, and a system message.

Optionally, the first network device may further send first information to the first relay device. The first information is used by the second relay device to determine at least one of a time domain start moment, a time domain end moment, and period information of the first resource.

Specifically, the first information may be used to trigger the first relay device to start to send the second signal on the first resource at a moment, or may be used to trigger the first relay device to stop sending the second signal on the first resource at a moment.

Optionally, the first information may trigger the first relay device only to start to send the second signal on the first resource at the specified time, and the first relay device stops sending the second signal on the first resource at the end of predefined maximum duration.

Optionally, the first information may alternatively trigger the first relay device only to start to send the second signal on the first resource at a specified time, and the first information carries the period information. The first relay device stops sending the second signal on the first resource at the end of this period, and starts to send the second signal on the first resource in a next period.

It should be understood that, the first information may be referred to as "trigger signaling".

Optionally, the first signal is a first synchronization signal, and the second signal is a second synchronization signal. That is, a synchronization signal may be used to implement discovery of the first relay device by the second relay device. This application provides a specific implementation.

It should be understood that, the first synchronization signal and the second synchronization signal may be a same type of synchronization signals. This is not limited in this application.

803. The first relay device determines the second resource based on the first configuration information.

Optionally, the first relay device may determine the first resource based on a predefined resource of the first network device, and determine the second resource in the first resource. For example, the first relay device may determine the first resource based on a cell identity (ID) of a cell to which the first network device belongs.

Optionally, the first relay device may alternatively receive the trigger signaling, and determines, based on the trigger signaling, at least one of the time domain end moment and the period information of the first resource.

804. The first relay device sends the second signal on the second resource. Correspondingly, the second relay device receives the second signal on the second resource.

Figure 9:
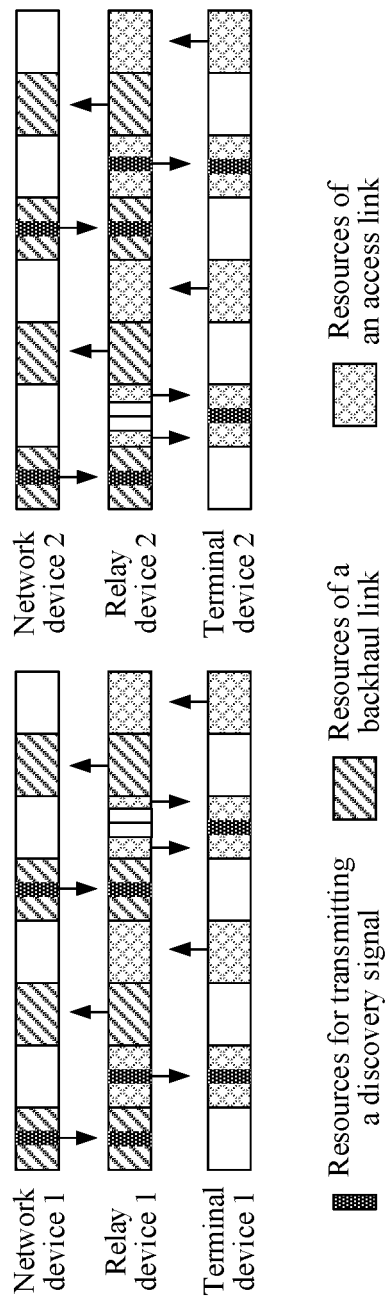
FIG. 9 is a schematic diagram of still yet another communication method according to an embodiment of this application.

The second relay device may determine the first resource based on the first configuration information. In this case, the network device configures the resource of the first signal with zero power, that is, the second network device does not send a signal on the first resource, and the first relay device sends the second signal on the second resource in the first resource, so that the second relay device can receive, on the first resource, the second signal sent by the first relay device. That is, the second relay device discovers the first relay device, as shown in FIG. 9.

Optionally, the second relay device sends the second signal on the first resource, and a terminal device may also receive the second signal.

Optionally, the second network device may determine a plurality of signals with zero power. Resources for sending the plurality of signals with zero power may be inconsecutive. The first network device may determine a resource for sending each signal with zero power, and configure, based on the configuration information sent in the foregoing embodiments, the resource for sending each signal for the first relay device to send another signal. Therefore, the second relay device can discover the first relay device, thereby improving reliability of device discovery.

Therefore, according to the communication method in this embodiment of this application, the network device configures a first resource of the first signal with zero power, and sends, to the second relay device, the first configuration information that indicates the first resource used by the second relay device to send the second signal. The first relay device determines, based on the first configuration information, the second resource in the first resource, and sends the second signal on the second resource. In this case, the second relay device can receive the second signal. That is, the second relay device discovers the first relay device, thereby improving signal transmission efficiency.

It should be understood that, the sequence numbers of the steps in the foregoing processes do not mean execution sequence in various embodiments of this application. The execution sequences of the processes should be determined based on functions and internal logic of the processes, and should not be construed as any limitation on the implementation processes of the embodiments of this application.

Figure 10:
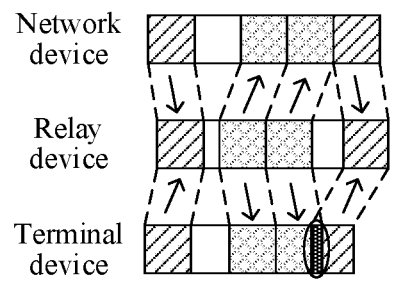
FIG. 10 is a schematic diagram of a communication method in a conventional solution.

In a communications system including a relay device that uses spatial multiplexing (SDM), transmission can be performed on a backhaul link and an access link simultaneously, provided that a downlink resource of the backhaul link and an uplink resource of the access link are aligned in time, and an uplink resource of the backhaul link and a downlink resource of the access link are aligned in time. For example, as shown in FIG. 10, a network device may determine, based on a transmission latency (namely, a timing advance (TA)) between the network device and a relay device, an interval between a time at which the network device transmits an uplink signal and a time at which the network device transmits a downlink signal, and notifies the relay device and a terminal device of the transmission latency between the network device and the relay device, so that the relay device can determine a transmission latency between the relay device and the terminal device based on the transmission latency between the network device and the relay device, thereby ensuring that a downlink resource of a backhaul link and an uplink resource of an access link are aligned in time. In this solution, the network device actively configures a TA for the relay device, causing a waste of resources.

Figure 11:
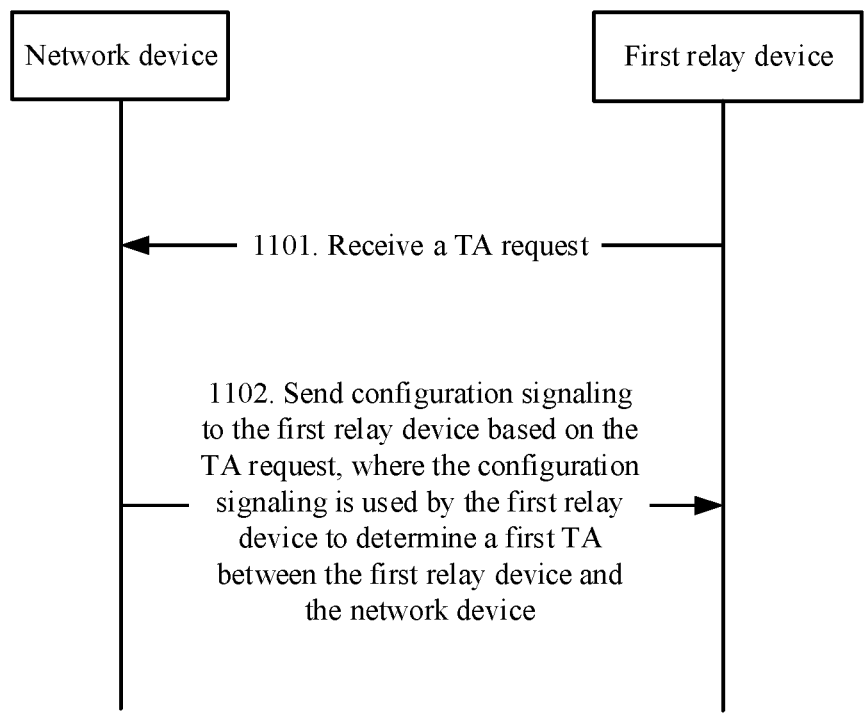
FIG. 11 is a schematic flowchart of a communication method according to an embodiment of this application.

FIG. 11 is a schematic flowchart of a communication method according to an embodiment of this application.

1101. A network device receives a timing advance (TA) request sent by a first relay device, where the TA request is used to request a TA between the network device and the first relay device.

Optionally, the TA request carries a second TA between the first relay device and a second relay device.

It should be noted that, the second relay device may be a device having a relay function or a device without a relay function. This is not limited in this application. For ease of description, the following embodiment is described by using an example in which the second relay device is a terminal device.

Each relay device can learn a maximum TA of another relay device connected to the relay device or a terminal device connected to the relay device. In this embodiment of this application, the first relay device may determine a maximum TA between the first relay device and a device connected to the first relay device as the first TA, or determine an average TA or a minimum TA between the first relay device and a device connected to the first relay device as a second TA. The network device receives the second TA sent by the first relay device between the first relay device and the second relay device, and determines a first TA between the network device and the first relay device based on the second TA. In this case, the network device configures the first TA for the first relay device based on the request of the first relay device, thereby avoiding a collision between an uplink resource and a downlink resource that are used by the terminal device to transmit signals, and improving signal transmission efficiency.

Optionally, the network device may alternatively receive a TA request that is sent by the first relay device and carries a first TA offset value between a second TA and a third TA, where the second TA is a TA between the first relay device and the second relay device, and the third TA is a current TA between the network device and the first relay device. The network device determines a second TA offset value based on the first TA offset value, and then configures the second TA offset value for the first relay device by using configuration signaling, so that the first relay device can determine a first TA based on the second TA offset value and the third TA, thereby avoiding a collision between an uplink resource and a downlink resource that are used by the second relay device to transmit signals, and improving signal transmission efficiency.

It should be understood that, the first TA may be an uplink or downlink transmission latency between the terminal device and the first relay device.

Optionally, the uplink transmission latency and the downlink transmission latency may be the same. This is not limited in this application.

Optionally, the first relay device may send a system message or a message (Msg) 3 to the network device, and add the TA request to the system message or the Msg3.

1102. The network device sends configuration signaling to the first relay device based on the TA request, where the configuration signaling is used by the first relay device to determine the first TA between the first relay device and the network device.

Optionally, the network device receives the TA request that is sent by the first relay device and that carries the second TA, and configures the first TA between the first relay device and the network device for the first relay device by using the configuration signaling, thereby avoiding a collision between an uplink resource and a downlink resource that are used by the second relay device to transmit signals, and improving signal transmission efficiency.

Optionally, the network device receives the TA request that is sent by the first relay device and that carries the second TA, and then configures the second TA offset value for the first relay device by using the configuration signaling, so that the first relay device can determine the first TA based on the second TA offset value. For example, the first relay device determines the first TA based on a third TA and the second TA offset value, and the first TA may be a sum of the third TA and the second TA offset value or a difference between the third TA and the second TA offset value. Therefore, a collision between an uplink resource and a downlink resource that are used by the second relay device to transmit signals is avoided, and signal transmission efficiency is improved.

Figure 12:
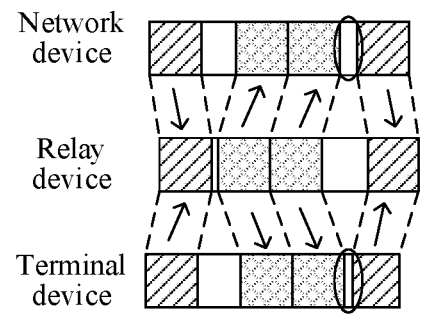
FIG. 12 is a schematic diagram of another communication method according to an embodiment of this application.

For example, as shown in FIG. 12, the network device may adjust an interval, namely, the first TA, between the time at which a signal is received and the time at which a signal is sent, so that a downlink resource used by the terminal device to receive a signal does not collide with an uplink resource used by the terminal device to send a signal.

Optionally, the network device receives a TA request that is sent by the first relay device and that carries a first TA offset value between a second TA and a third TA, determines a first TA based on the first TA offset value, and configures the first TA between the first relay device and the network device for the first relay device by using the configuration signaling, thereby avoiding a collision between an uplink resource and a downlink resource that are used by the second relay device to transmit signals, and improving signal transmission efficiency.

Optionally, the network device receives a TA request that is sent by the first relay device and that carries a first TA offset value between a second TA and a third TA, and then configures the second TA offset value for the first relay device by using the configuration signaling, so that the first relay device can determine a first TA based on the second TA offset value and the third TA. The second TA offset value may be determined based on the first TA offset value. For example, the first relay device determines the first TA based on the third TA and the second TA offset value, and the first TA may specifically be a sum of the third TA and the second TA offset value or a difference between the third TA and the second TA offset value. Therefore, a collision between an uplink resource and a downlink resource that are used by the second relay device to transmit signals is avoided, and signal transmission efficiency is improved.

Optionally, the network device may send, to the first relay device, at least one of a broadcast message, a system message, a master message block, and a system message block that include the configuration information, where the system message may be a remaining minimum system message (RMSI).

Optionally, the network device may add the configuration signaling to RRC signaling or an MAC CE.

Optionally, the network device may adjust a cell in which the terminal device is located to send a signal based on $N_{TA\_offset}$, and the network device may further indicate a transmission latency between the network device and the relay device and $N_{TA\_offset}$ to each user in the cell by using user-level higher layer signaling, so that each terminal device in the cell can adjust, based on $N_{TA\_offset}$, a TA offset value used by the terminal device to transmit a signal, thereby avoiding a collision between an uplink resource and a downlink resource.

Optionally, the user-level higher layer signaling may be a broadcast message or a system message.

Optionally, this method may further be applied to a communications system including a plurality of relay devices. For example, in FIG. 2, the network device communicates with the terminal device by using two relay devices. If an example in which the first relay device is a relay device connected to the terminal device, and there is further the second relay device between the first relay device and the network device is used for description, the first relay device needs the second relay device to forward a first TA request to the network device, the second relay device also needs to determine a second transmission latency between the second relay device and the first relay device and send a second TA request that carries the second transmission latency to the network device, and the network device determines, based on a first transmission latency and the second transmission latency, an interval between the times at which signals are transmitted.

Figure 13:
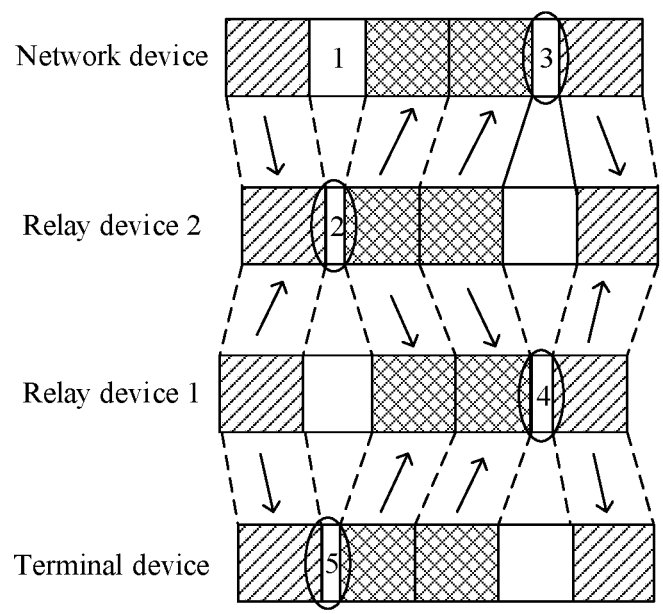
FIG. 13 is a schematic diagram of still another communication method according to an embodiment of this application.

For example, as shown in FIG. 13, a network device may configure a time interval 1 between a downlink resource for sending a signal and an uplink resource for receiving a signal, and notify a relay device 2, a relay device 1, and a terminal device of the time interval 1, so that the relay device 2 can determine, based on a transmission latency between the network device and the relay device 2 and the time interval 1, a time interval 2 between a resource for receiving a signal and a resource for sending a signal. In addition, the terminal device may determine, based on a transmission latency between the relay device 1 and the terminal device, a transmission latency between the relay device 1 and the relay device 2, and the time interval 2, a time interval 5 between a resource for receiving a signal and a resource for sending a signal.

It should be understood that, the time interval shown in FIG. 13 may be a timing advance, or may be obtained by using a current timing advance and an offset value of the current timing advance. This is not limited in this application.

In addition, the network device configures a time interval 3 between a resource for receiving a signal and a resource for sending a signal. The relay device 1 determines, based on a transmission latency between the relay device 2 and the network device and the time interval 3, a location of a resource used by the relay device 2 to receive a signal, and then determines a time interval 4 between a resource for receiving a signal and a resource for sending a signal based on a transmission latency between the relay device 1 and the relay device 2. The terminal device determines, based on a transmission latency between the relay device 1 and the terminal device, a location of a resource for receiving a signal 4.

Optionally, the second TA request may also be carried by higher layer signaling.

It should be noted that the first TA request and the second TA request may be carried by the same piece of higher layer signaling or different pieces of higher layer signaling. This is not limited in this application.

Therefore, according to the communication method in this embodiment of this application, the network device receives the TA request, and configures the first TA between the first relay device and the network device for the first relay device based on the TA request. In this case, the network device configures the first TA for the first relay device based on the request of the first relay device, thereby avoiding the case in which configuration of the first TA is still performed even when the first TA is not required. In this embodiment of this application, system resources are saved.

It should be understood that, the sequence numbers of the foregoing processes do not mean the execution sequences in various embodiments of this application. The execution sequences of the processes should be determined based on functions and internal logic of the processes, and should not be construed as any limitation on the implementation processes of the embodiments of this application.

Figure 14:
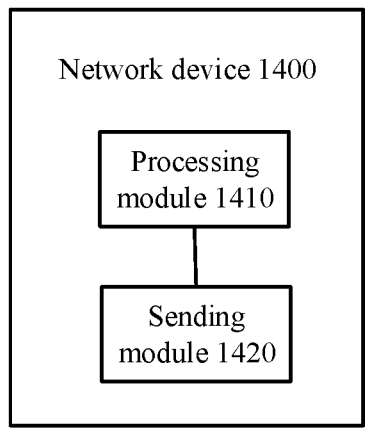
FIG. 14 is a schematic block diagram of a network device according to an embodiment of this application.

FIG. 14 is a schematic block diagram of a network device 1400 according to an embodiment of this application. As shown in FIG. 14, the network device 1400 includes a processing module 1410 and a sending module 1420.

The processing module 1410 is configured to determine a first resource. The first resource includes a resource used by a second network device to send a first signal to a second relay device, or the first resource includes a resource configured by the second network device for a first signal with zero power.

The sending module 1420 is configured to send first configuration information to the first relay device. The first configuration information is used by the first relay device to determine a second resource for sending a second signal, and the second resource is a part or all of the first resource.

Therefore, according to the network device in this embodiment in this application, a first network device determines the first resource including the resource used by the second network device to send the first signal to the second relay device, and sends the first configuration information to the first relay device, so that the first relay device determines the second resource that is for sending the second signal and that is in the first resource based on the first configuration information, and sends the second signal on the second resource. In this case, the second relay device can receive the second signal on the part or all of the first resource. That is, the second relay device discovers the first relay device, thereby improving signal transmission efficiency.

Optionally, the first configuration information is used to indicate the second resource.

Optionally, the first configuration information is used to indicate a third resource used by the first relay device to send the second signal. The sending module 1420 is further configured to send second configuration information to the first relay device. The second configuration information is used to indicate a time domain offset between the third resource and the second resource.

Optionally, if the first resource includes the resource used by the second network device to send the first signal to the second relay device, the sending module 1420 is further configured to send a third signal to the first relay device on the third resource.

Optionally, the time domain offset is at least one of at least one subframe, at least one half-subframe, and at least one slot.

Optionally, the sending module 1420 is further configured to send first information to the first relay device. The first information is used by the first relay device to determine at least one of a time domain start moment, a time domain end moment, and period information of the second resource for transmitting the second signal.

Therefore, according to the network device in this embodiment in this application, the first network device determines the first resource including the resource used by the second network device to send the first signal to the second relay device, and sends the first configuration information to the first relay device, so that the first relay device determines the second resource that is for sending the second signal and that is in the first resource based on the first configuration information, and sends the second signal on the second resource. In this case, the second relay device can receive the second signal on the part or all of the first resource. That is, the second relay device discovers the first relay device, thereby improving signal transmission efficiency.

It should be understood that, the network device 1400 in this embodiment of this application may correspond to the network device in the communication method shown in FIG. 4 in the embodiment of this application, and the foregoing management operations and/or functions and another management operation and/or function of the modules in the network device 1400 are intended to implement corresponding steps of the foregoing methods. For brevity, details are not described herein.

Figure 15:
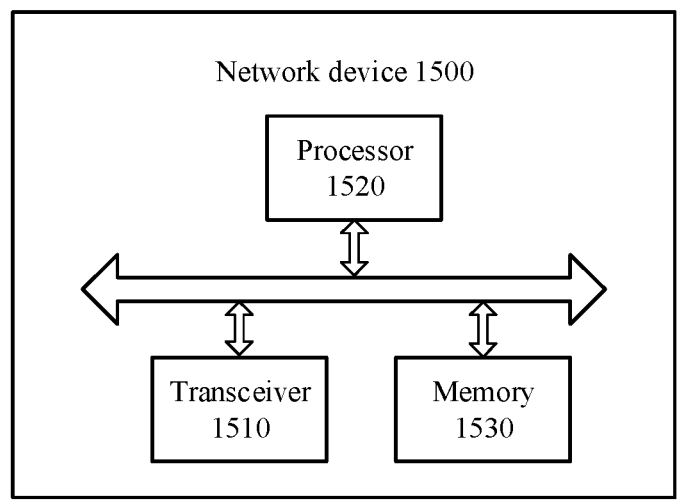
FIG. 15 is a schematic structural diagram of a network device according to an embodiment of this application.

In this embodiment of this application, the sending module 1420 may be implemented by a transceiver, and the processing module 1410 may be implemented by a processor. As shown in FIG. 15, a network device 1500 may include a transceiver 1510, a processor 1520, and a memory 1530. The memory 1530 may be configured to store indication information, and may be further configured to store code, an instruction, and the like that are executed by the processor 1520.

Figure 16:
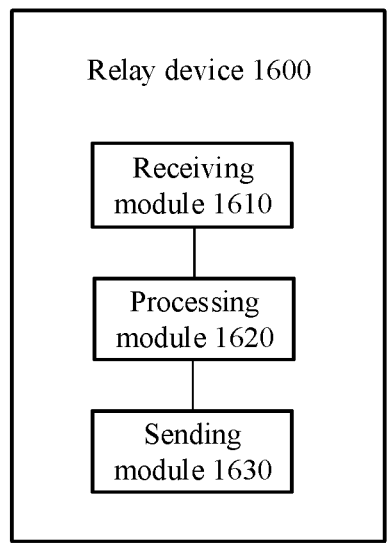
FIG. 16 is a schematic block diagram of a relay device according to an embodiment of this application.

FIG. 16 is a schematic block diagram of a relay device 1600 according to an embodiment of this application. As shown in FIG. 16, the relay device 1600 includes a receiving module 1610, a processing module 1620, and a sending module 1630.

The receiving module 1610 is configured to receive first configuration information sent by a first network device.

The processing module 1620 is configured to determine a second resource based on the first configuration information. The second resource is a part or all of a first resource. The first resource includes a resource used by the second network device to send a first signal to the second relay device, or the first resource includes a resource configured by the second network device for a first signal with zero power.

The sending module 1630 is configured to send a second signal on the second resource.

Therefore, according to the relay device in this embodiment of this application, a first relay device receives the first configuration information sent by the first network device, determines the second resource that is for sending the second signal and that is in the first resource based on the first configuration information, and sends the second signal on the second resource, so that the second relay device can receive the second signal on the part or all of the first resource. That is, the second relay device discovers the first relay device, thereby improving signal transmission efficiency.

Optionally, the first configuration information is used to indicate the second resource.

Optionally, the first configuration information is used to indicate a third resource used by the relay device to send the second signal. The receiving module 1610 is further configured to receive second configuration information sent by the first network device. The second configuration information is used to indicate a time domain offset between the third resource and the second resource.

The processing module 1620 is specifically configured to determine the second resource based on the first configuration information and the time domain offset.

Optionally, if the first resource includes the resource used by the network device to send the first signal to the second relay device, the receiving module 1610 is further configured to receive a third signal sent by the first network device on the third resource.

Optionally, the time domain offset is at least one of at least one subframe, at least one half-subframe, and at least one slot.

Optionally, the receiving module 1610 is further configured to receive first information sent by the first network device. The processing module 1620 is further configured to determine, based on the first information, at least one of a time domain start moment, a time domain end moment, and period information of the second resource for transmitting the second signal.

Therefore, according to the relay device in this embodiment of this application, the first relay device receives the first configuration information sent by the first network device, determines the second resource that is for sending the second signal and that is in the first resource based on the first configuration information, and sends the second signal on the second resource, so that the second relay device can receive the second signal on the part or all of the first resource. That is, the second relay device discovers the first relay device, thereby improving signal transmission efficiency.

It should be understood that, the relay device 1600 in this embodiment of this application may correspond to the relay device in the communication method shown in FIG. 4 in the embodiment of this application, and the foregoing management operations and/or functions and another management operation and/or function of the modules in the relay device 1600 are intended to implement corresponding steps of the foregoing methods. For brevity, details are not described herein.

Figure 17:
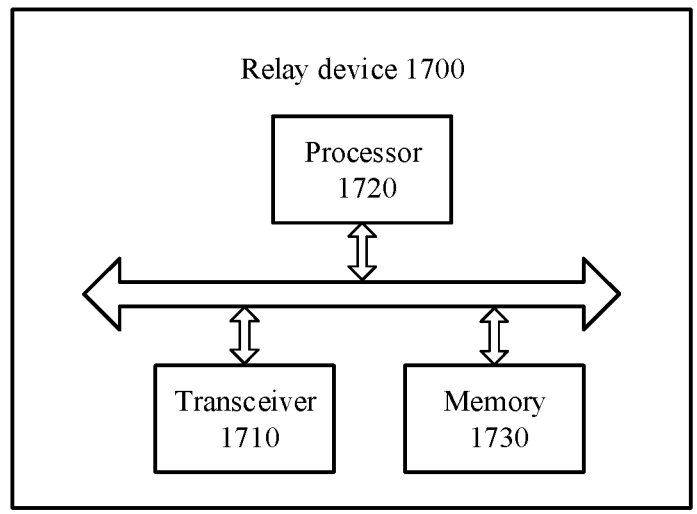
FIG. 17 is a schematic structural diagram of a relay device according to an embodiment of this application.

In this embodiment of this application, the receiving module 1610 and the sending module 1630 may be implemented by a transceiver, and the processing module 1620 may be implemented by a processor. As shown in FIG. 17, a relay device 1700 may include a transceiver 1710, a processor 1720, and a memory 1730. The memory 1730 may be configured to store indication information, and may be further configured to store code, an instruction, and the like that are executed by the processor 1720.

It should be understood that, the processor 1520 or the processor 1720 may be an integrated circuit chip, and has a signal processing capability. In an implementation process, steps in the foregoing method embodiments can be completed by using a hardware integrated logical circuit in the processor, or by using an instruction in a form of software. The processor may be a general purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and the logical block diagrams that are disclosed in the embodiments of the present disclosure. The general purpose processor may be a microprocessor, or the processor may be any conventional processor or the like. Steps of the methods disclosed with reference to the embodiments of the present disclosure may be directly executed and completed by using a hardware decoding processor, or may be executed and completed by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with hardware of the processor.

It may be understood that, the memory 1830 or the memory 2030 in the embodiments of the present disclosure may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM). It should be noted that, the memory of the systems and methods described in this specification includes but is not limited to these memories and any memory of another proper type.

Figure 18:
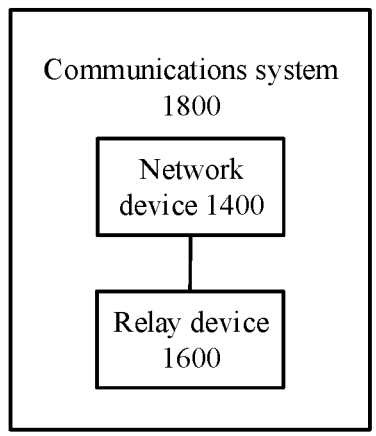
FIG. 18 is a schematic block diagram of a communications system according to an embodiment of this application.

FIG. 18 shows a communications system 1800 according to an embodiment of this application. The communications system 1800 includes the network device 1400 in the embodiment shown in FIG. 14 and the relay device 1600 in the embodiment shown in FIG. 16.

This embodiment of this application further provides a computer storage medium, and the computer storage medium may store a program instruction for indicating any one of the foregoing methods.

Optionally, the storage medium may be the memory 1530 or the memory 1730.

This embodiment of this application further provides a chip system. The chip system includes a processor, configured to support a distributed unit, a centralized unit, and a terminal device in implementing a function in the foregoing embodiments, for example, generating or processing data and/or information in the foregoing methods.

In a possible design, the chip system further includes a memory. The memory is configured to store program instructions and data that are necessary to the distributed unit, the centralized unit, and the terminal device. The chip system may include a chip, or may include a chip and another discrete component. It should be understood that, data and/or information processed by the chip may be received from a base station, and data and/or information obtained after processing may also be sent to the base station.

Figure 19:
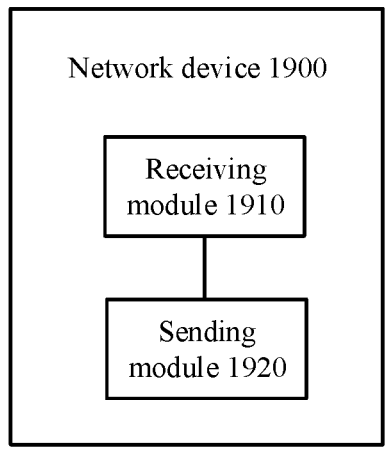
FIG. 19 is a schematic block diagram of a network device according to an embodiment of this application.

FIG. 19 is a schematic block diagram of a network device according to an embodiment of this application. As shown in FIG. 19, the network device 1900 includes a receiving module 1910 and a sending module 1920.

The receiving module 1910 is configured to receive a timing advance TA request sent by a first relay device.

The sending module 1920 is configured to send configuration signaling to the first relay device based on the TA request. The configuration signaling is used by the first relay device to determine a first TA between the first relay device and the network device.

Therefore, according to the network device in this embodiment of this application, the network device receives the TA request, and configures the first TA between the first relay device and the network device for the first relay device based on the TA request. In this case, the network device configures the first TA for the first relay device based on the request of the first relay device, thereby avoiding the scenario in which TA configuration is still performed even when the first TA is not required. In this embodiment of this application, system resources are saved.

Optionally, the TA request carries a second TA between the first relay device and the second relay device. The sending module 1920 is specifically configured to: determine the first TA based on the second TA, and send the configuration signaling to the first relay device. The configuration signaling carries the first TA.

Optionally, the TA request carries a first TA offset value between a second TA and a third TA. The second TA is a TA between the first relay device and the second relay device, and the third TA is a current TA between the network device and the first relay device. The sending module 1920 is configured to: determine the first TA based on the first TA offset value, and send the configuration signaling to the first relay device. The configuration signaling carries the first TA.

Optionally, the TA request carries a first TA offset value between a second TA and a third TA. The second TA is a TA between the first relay device and the second relay device, and the third TA is a current TA between the network device and the first relay device. The sending module 1920 is specifically configured to: determine a second TA offset value between the first TA and the third TA based on the first TA offset value. The network device sends the configuration signaling to the first relay device. The configuration signaling carries the second TA offset value.

Optionally, the TA request carries a second TA between the first relay device and the second relay device. The sending module 1920 is specifically configured to: determine a second TA offset value between the first TA and the third TA based on the second TA. The third TA is a current TA between the network device and the first relay device. The network device sends the configuration signaling to the first relay device. The configuration signaling carries the second TA offset value.

Optionally, the sending module 1920 is configured to send, to the first relay device, at least one of a broadcast message, a system message, a master message block, and a system message block that include the configuration signaling.

Therefore, according to the network device in this embodiment of this application, the network device receives the TA request, and configures the first TA between the first relay device and the network device for the first relay device based on the TA request. In this case, the network device configures the first TA for the first relay device based on the request of the first relay device, thereby avoiding a case in which configuration is still performed when the first TA is not required. In this embodiment of this application, system resources are saved.

It should be understood that, the network device 1900 may correspond to the network device in the communication method shown in FIG. 11, and the foregoing management operations and/or functions and another management operation and/or function of the modules in the network device 1900 are intended to implement corresponding steps of the foregoing methods. For brevity, details are not described herein.

Figure 20:
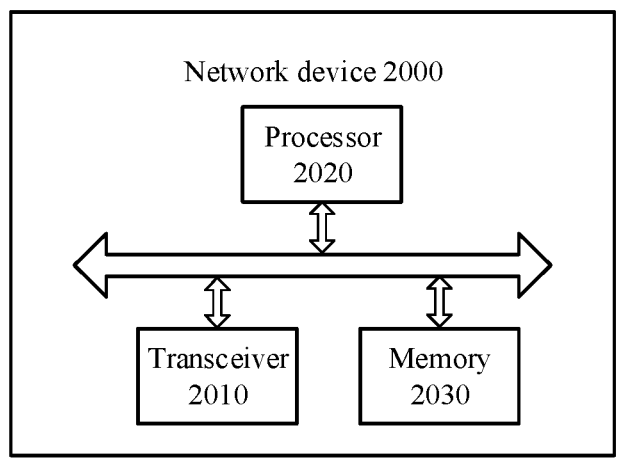
FIG. 20 is a schematic structural diagram of a network device according to an embodiment of this application.

In this embodiment of this application, the receiving module 1910 and the sending module 1920 may be implemented by a transceiver. As shown in FIG. 20, a network device 2000 may include a transceiver 2010, a processor 2020, and a memory 2030. The memory 2030 may be configured to store indication information, and may be further configured to store code, instructions, software program and the like that can be executed by the processor 2020.

Figure 21:
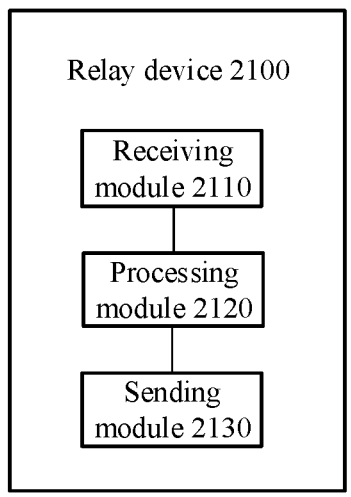
FIG. 21 is a schematic block diagram of a relay device according to an embodiment of this application.

FIG. 21 is a schematic block diagram of a relay device 2100 according to an embodiment of this application. As shown in FIG. 21, the relay device 2100 includes a sending module 2110, a receiving module 2120, and a processing module 2130.

The sending module 2110 is configured to send a timing advance TA request to a network device.

The receiving module 2120 is configured to receive configuration signaling sent by the network device. The configuration signaling is determined by the network device based on the TA request.

The processing module 2130 is configured to determine a first TA between the first relay device and the network device based on the configuration signaling.

Therefore, according this embodiment of this application, the first relay device sends the TA request to the network device, receives the configuration signaling determined by the network device based on the TA request, and determines the first TA between the first relay device and the network device based on the configuration signaling. In other words, the network device configures the first TA based on the request of the first relay device, thereby avoiding the scenario in which TA configuration is still performed even when the first TA is not required. In this embodiment of this application, system resources are saved.

Optionally, the TA request carries a second TA between the first relay device and the second relay device. The configuration signaling carries the first TA, and the first TA is determined by the network device based on the second TA.

Optionally, the TA request carries a second TA between the first relay device and the second relay device. The configuration signaling carries a second TA offset value between the first TA and the third TA, and the second TA offset value is determined by the network device based on the second TA. The processing module 2130 is configured to determine the first TA based on the second TA offset value.

Optionally, the TA request carries a first TA offset value between a second TA and a third TA. The second TA is a TA between the first relay device and the second relay device, and the third TA is a TA between the network device and the first relay device. The configuration signaling carries a second TA offset value between the first TA and the third TA, and the second TA offset value is determined by the network device based on the first TA offset value. The processing module 2130 is configured to determine the first TA based on the second TA offset value.

Optionally, the TA request carries a first TA offset value between a second TA and a third TA. The second TA is a TA between the first relay device and the second relay device, and the third TA is a TA between the network device and the first relay device. The configuration signaling carries the first TA, and the first TA is determined by the network device based on the first TA offset value.

Optionally, the receiving module 2120 is specifically configured to receive at least one of a broadcast message, a system message, a master message block, and a system message block that include the configuration signaling and that are sent by the network device.

Therefore, according to this embodiment of this application, the first relay device sends the TA request to the network device, receives the configuration signaling determined by the network device based on the TA request, and determines the first TA between the first relay device and the network device based on the configuration signaling. In other words, the network device configures the first TA based on the request of the first relay device, thereby avoiding the scenario in which TA configuration is still performed even when the first TA is not required. In this embodiment of this application, system resources are saved.

It should be understood that, the relay device 2100 in this embodiment of this application may correspond to the relay device in the communication method shown in FIG. 11, and the foregoing management operations and/or functions and another management operation and/or function of the modules in the relay device 2100 are intended to implement the corresponding steps of the foregoing methods. For brevity, details are not described herein.

Figure 22:
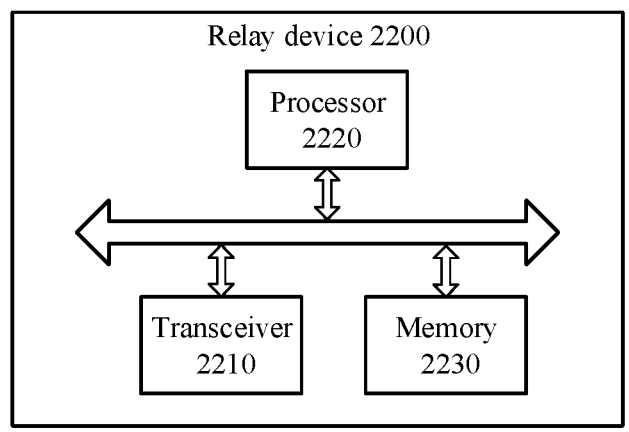
FIG. 22 is a schematic structural diagram of a relay device according to an embodiment of this application.

In this embodiment of this application, the receiving module 2110 and the sending module 2120 may be implemented by a transceiver, and the processing module 2130 may be implemented by a processor. As shown in FIG. 22, a relay device 2200 may include a transceiver 2210, a processor 2220, and a memory 2230. The memory 2230 may be configured to store indication information, and may be further configured to store code, an instruction, and the like that are executed by the processor 2220.

It should be understood that, the processor 2020 or the processor 2220 may be an integrated circuit chip, and has a signal processing capability. In an implementation process, steps in the foregoing method embodiments can be completed by using a hardware integrated logical circuit in the processor, or by using an instruction in a form of software. The processor may be a general purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and the logical block diagrams that are disclosed in the embodiments of the present disclosure. The general purpose processor may be a microprocessor, or the processor may be any conventional processor or the like. Steps of the methods disclosed with reference to the embodiments of the present disclosure may be directly executed and completed by using a hardware decoding processor, or may be executed and completed by using a combination of hardware and software modules in a decoding processor. The software module may be located in a storage medium in the art, such as a random access memory, a flash memory, a read-only memory, a programmable read-only memory, an electrically erasable programmable memory, or a register. The storage medium may be located in a memory, and the processor reads information in the memory and completes the steps in the foregoing methods in combination with hardware of the processor.

It may be understood that, the memory 2030 or the memory 2230 in the embodiments of the present disclosure may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM). It should be noted that, the memory of the systems and methods described in this specification includes but is not limited to these types of memories and any memory of another proper type.

Figure 23:
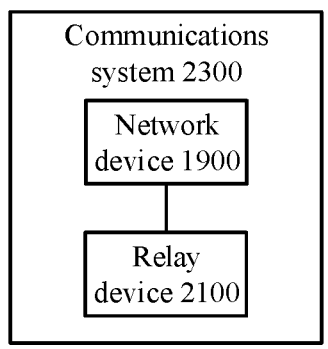
FIG. 23 is a schematic block diagram of a communications system according to an embodiment of this application.

FIG. 23 shows a communications system 2300 according to an embodiment of this application. The communications system 2300 includes the network device 1900 in the embodiment shown in FIG. 19 and the relay device 2100 in the embodiment shown in FIG. 21.

This embodiment of this application further provides a computer storage medium, and the computer storage medium may store a program instruction for indicating any one of the foregoing methods.

Optionally, the storage medium may be the memory 2030 or the memory 2230.

This embodiment of this application further provides a chip system. The chip system includes a processor, configured to support a distributed unit, a centralized unit, and a terminal device in implementing a function in the foregoing embodiments, for example, generating or processing data and/or information in the foregoing methods.

In a possible design, the chip system further includes a memory. The memory is configured to store program instructions and data that are necessary to the distributed unit, the centralized unit, and the terminal device. The chip system may include a chip, or may include a chip and another discrete component. It should be understood that data and/or information processed by the chip may be received from a base station, and data and/or information obtained after processing may also be sent to the base station.

Persons of ordinary skill in the art would understand that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of technical solutions. Persons skilled in the art may use different methods to implement the described functions for each particular application, but it should not be considered that the implementation goes beyond the scope of this application.

Persons skilled in the art, for the purpose of convenient and brief description, for a detailed working process of the foregoing system, apparatus, and unit, may refer to a corresponding process in the foregoing method embodiments, and details are not described herein again.

In the several embodiments provided in this application, it should be understood that the disclosed system, apparatus, and method may be implemented in another manner. For example, the described apparatus embodiments are merely examples. For example, the unit division is merely logical function division and may be other division in actual implementation. For example, a plurality of units or components may be combined or integrated into another system, or some features may be omitted or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes various mediums that can store program code, such as a USB flash drive, a removable hard disk, a read-only memory (RAM), a magnetic disk, and an optical disc.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable mediums. The usable medium may be a magnetic medium (for example, a floppy disk, a hard disk, or a magnetic tape), an optical medium (for example, a digital video disc (DVD), a semiconductor medium (for example, a solid-state drive (SSD)), or the like.

What is claimed is:

1. A communication method, comprising:
    determining, by a first network device, a first resource, wherein the first resource comprises a resource used by a second network device to send a first signal to a second relay device, or the first resource comprises a resource configured by the second network device for a first signal with zero power; and
    sending, by the first network device, first configuration information to a first relay device, wherein the first relay device determines a second resource for sending a second signal based on the first configuration information, and the second resource is a part or all of the first resource.

2. The communication method according to claim 1, wherein the first configuration information indicates the second resource.

3. The communication method according to claim 1, wherein the first configuration information indicates a third resource used by the first relay device to send the second signal, and the method further comprises:
    sending, by the first network device, second configuration information to the first relay device, wherein the second configuration information indicates a time domain offset between the third resource and the second resource.

4. The communication method according to claim 3, wherein if the first resource comprises the resource used by the second network device to send the first signal to the second relay device, the method further comprises:
    sending, by the first network device, a third signal to the first relay device on the third resource.

5. The communication method according to claim 3, wherein the time domain offset is at least one of at least one subframe, at least one half-subframe, and at least one slot.

6. The communication method according to claim 1, wherein the method further comprises:
sending, by the first network device, first information to the first relay device, wherein, based on the first information, the first relay device determines at least one of a time domain start moment, a time domain end moment, and period information of the second resource for transmitting the second signal.

7. A network device, comprising:
a processing module, configured to determine a first resource, wherein the first resource comprises a resource used by a second network device to send a first signal to a second relay device, or the first resource comprises a resource configured by the second network device for a first signal with zero power; and
a sending module, configured to send first configuration information to the first relay device, wherein the first configuration information is used by the first relay device to determine a second resource for sending a second signal, and the second resource is a part or all of the first resource.

8. The network device according to claim 7, wherein the first configuration information indicates the second resource.

9. The network device according to claim 7, wherein the first configuration information indicates a third resource used by the first relay device to send the second signal, the sending module is further configured to send second configuration information to the first relay device, and the second configuration information indicates a time domain offset between the third resource and the second resource.

10. The network device according to claim 9, wherein if the first resource comprises the resource used by the second network device to send the first signal to the second relay device, the sending module is further configured to send a third signal to the first relay device on the third resource.

11. The network device according to claim 9, wherein the time domain offset is at least one of at least one subframe, at least one half-subframe, and at least one slot.

12. The network device according to claim 7, wherein the sending module is further configured to send first information to the first relay device, the first information is used by the first relay device to determine at least one of a time domain start moment, a time domain end moment, and period information of the second resource for transmitting the second signal.

13. A relay device, comprising:
a receiving module, configured to receive first configuration information sent by a first network device;
a processing module, configured to determine, a second resource based on the first configuration information, wherein the second resource is a part or all of a first resource, and the first resource comprises a resource used by a second network device to send a first signal to a second relay device, or the first resource comprises a resource configured by the second network device for a first signal with zero power; and
a sending module, configured to send a second signal on the second resource.

14. The relay device according to claim 13, wherein the first configuration information is used to indicate the second resource.

15. The relay device according to claim 13, wherein the first configuration information is used to indicate a third resource used by the relay device to send the second signal, the receiving module is further configured to receive second configuration information sent by the first network device, and the second configuration information is used to indicate a time domain offset between the third resource and the second resource; and
the processing module is configured to:
determining, the second resource based on the first configuration information and the time domain offset.

16. The relay device according to claim 15, wherein if the first resource comprises the resource used by the second network device to send the first signal to the second relay device, the receiving module is further configured to receive, on the third resource, a third signal sent by the first network device.

17. The relay device according to claim 15, wherein the time domain offset is at least one of at least one subframe, at least one half-subframe, and at least one slot.

18. The relay device according to claim 13, wherein the receiving module is further configured to receive first information sent by the first network device, and the processing module is further configured to determine, based on the first information, at least one of a time domain start moment, a time domain end moment, and period information of the second resource for transmitting the second signal.

* * * * *